United States Patent
Park et al.

(10) Patent No.: US 10,567,057 B2
(45) Date of Patent: Feb. 18, 2020

(54) METHOD FOR PERFORMING CHANNEL ESTIMATION IN WIRELESS COMMUNICATION SYSTEM AND APPARATUS THEREFOR

(71) Applicants: LG ELECTRONICS INC., Seoul (KR); SOGANG UNIVERSITY RESEARCH FOUNDATION, Seoul (KR)

(72) Inventors: Jonghyun Park, Seoul (KR); Wonjin Sung, Seoul (KR); Yoonsoo Kim, Seoul (KR); Kijun Kim, Seoul (KR)

(73) Assignees: LG ELECTRONICS INC., Seoul (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 202 days.

(21) Appl. No.: 15/540,883

(22) PCT Filed: Dec. 18, 2015

(86) PCT No.: PCT/KR2015/013954
§ 371 (c)(1),
(2) Date: Jun. 29, 2017

(87) PCT Pub. No.: WO2016/108483
PCT Pub. Date: Jul. 7, 2016

(65) Prior Publication Data
US 2017/0373743 A1    Dec. 28, 2017

Related U.S. Application Data

(60) Provisional application No. 62/098,308, filed on Dec. 30, 2014.

(51) Int. Cl.
H04B 7/06 (2006.01)
H04L 5/00 (2006.01)
(Continued)

(52) U.S. Cl.
CPC ......... *H04B 7/0626* (2013.01); *H04L 5/0035* (2013.01); *H04L 5/0048* (2013.01);
(Continued)

(58) Field of Classification Search
None
See application file for complete search history.

(56) References Cited

U.S. PATENT DOCUMENTS

| 8,260,208 B2 | 9/2012 | Auer |
| 2010/0087151 A1* | 4/2010 | Auer ..................... H04L 5/0023 455/67.11 |
| 2010/0232384 A1 | 9/2010 | Farajidana et al. |

(Continued)

*Primary Examiner* — Gregory B Sefcheck
*Assistant Examiner* — Jenkey Van
(74) *Attorney, Agent, or Firm* — Birch, Stewart, Kolasch & Birch, LLP

(57) ABSTRACT

A method for performing, by a UE, channel estimation in a wireless communication system includes: receiving, from an eNB, a control message including reference signal transmission pattern information representing a transmission pattern of a channel estimation reference signal (RS) transmitted through antenna ports; receiving the reference signal from the eNB on the basis of the received reference signal transmission pattern information; measuring a channel per antenna port of the eNB on the basis of the received reference signal; and feeding back channel state information related to the measured channel to the eNB.

15 Claims, 23 Drawing Sheets

(51) Int. Cl.
  *H04L 25/02* (2006.01)
  *H04B 7/0456* (2017.01)
  *H04W 72/08* (2009.01)
(52) U.S. Cl.
  CPC ........ *H04L 25/0204* (2013.01); *H04B 7/0478* (2013.01); *H04W 72/08* (2013.01)

(56) References Cited

U.S. PATENT DOCUMENTS

| | | | |
|---|---|---|---|
| 2012/0039298 A1* | 2/2012 | Lee | H04L 1/0079 370/330 |
| 2012/0106374 A1* | 5/2012 | Gaal | H04L 5/0048 370/252 |
| 2012/0120842 A1* | 5/2012 | Kim | H04B 7/024 370/252 |
| 2013/0039316 A1 | 2/2013 | Kwon et al. | |
| 2013/0120191 A1* | 5/2013 | Zhang | H04B 7/0469 342/377 |
| 2013/0308715 A1* | 11/2013 | Nam | H04B 7/0469 375/267 |
| 2014/0098689 A1* | 4/2014 | Lee | H04B 7/0469 370/252 |
| 2014/0219377 A1 | 8/2014 | Guey et al. | |
| 2014/0314041 A1 | 10/2014 | Kim et al. | |
| 2015/0063287 A1* | 3/2015 | Mazzarese | H04W 24/10 370/329 |
| 2015/0280875 A1* | 10/2015 | Jing | H04L 5/0023 370/329 |
| 2016/0028519 A1* | 1/2016 | Wei | H04B 7/0456 375/267 |
| 2016/0248495 A1* | 8/2016 | Shikida | H04B 7/0413 |
| 2017/0288758 A1* | 10/2017 | Kakishima | H04B 7/04 |

\* cited by examiner

[Figure 1]
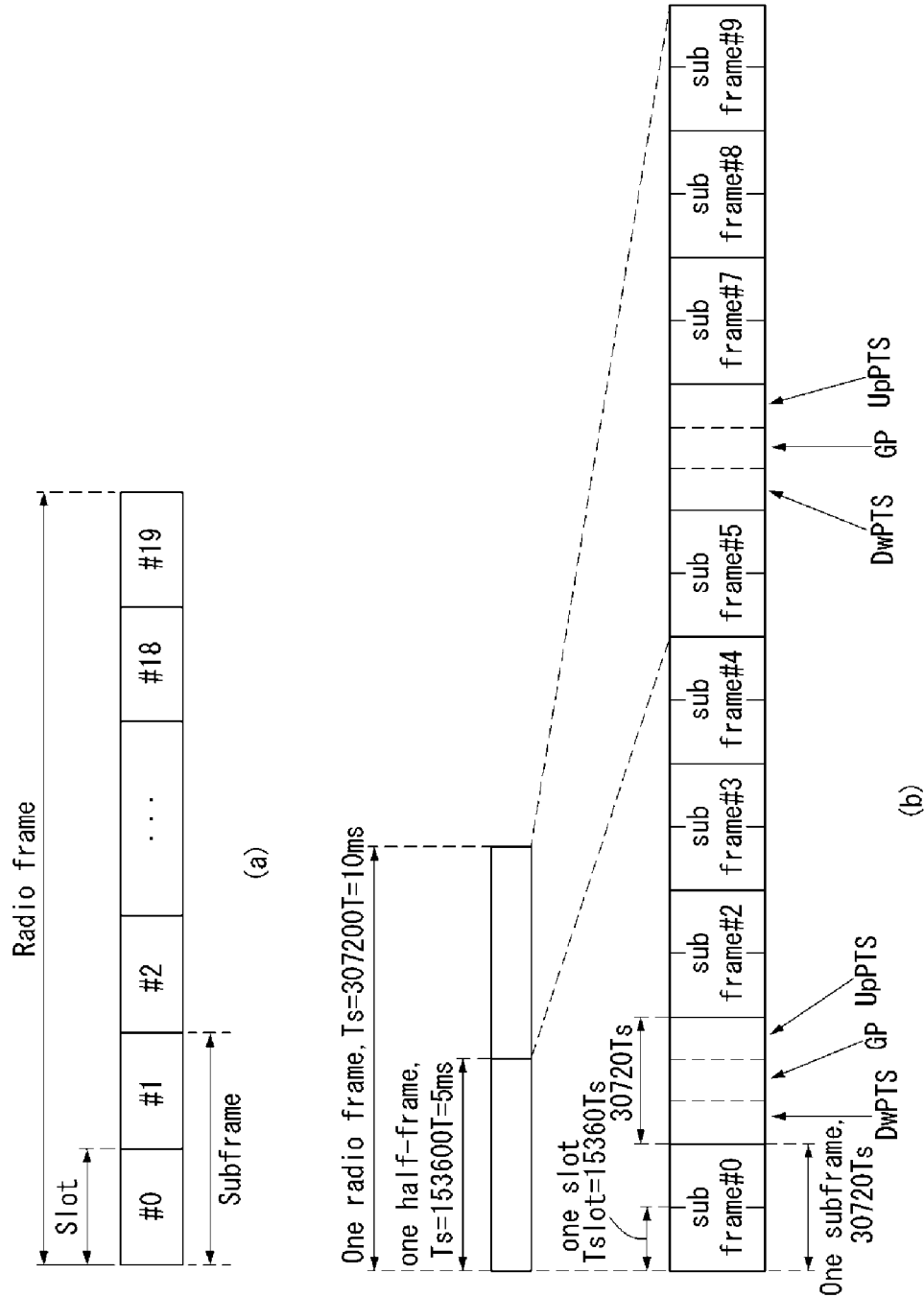

[Figure 2]
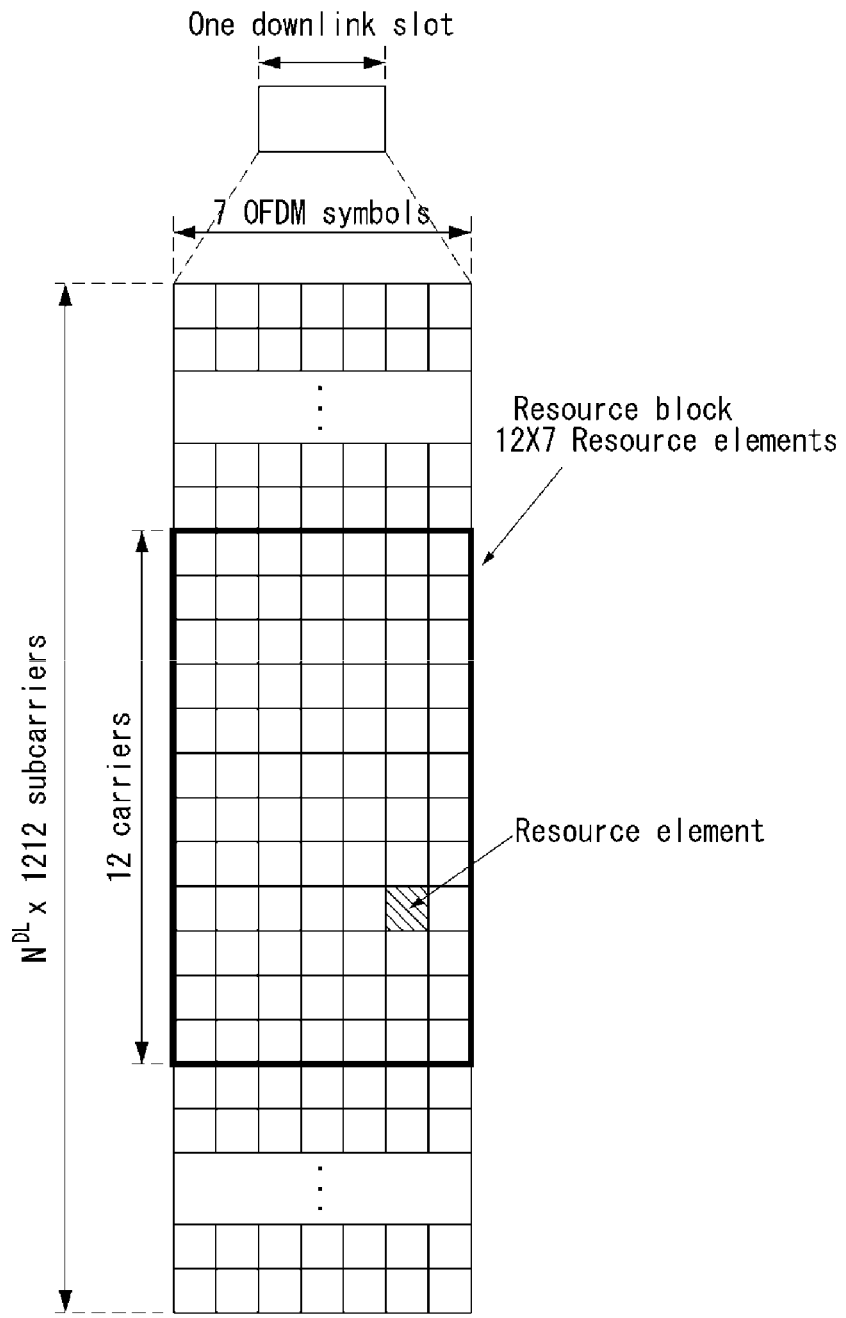

[Figure 3]
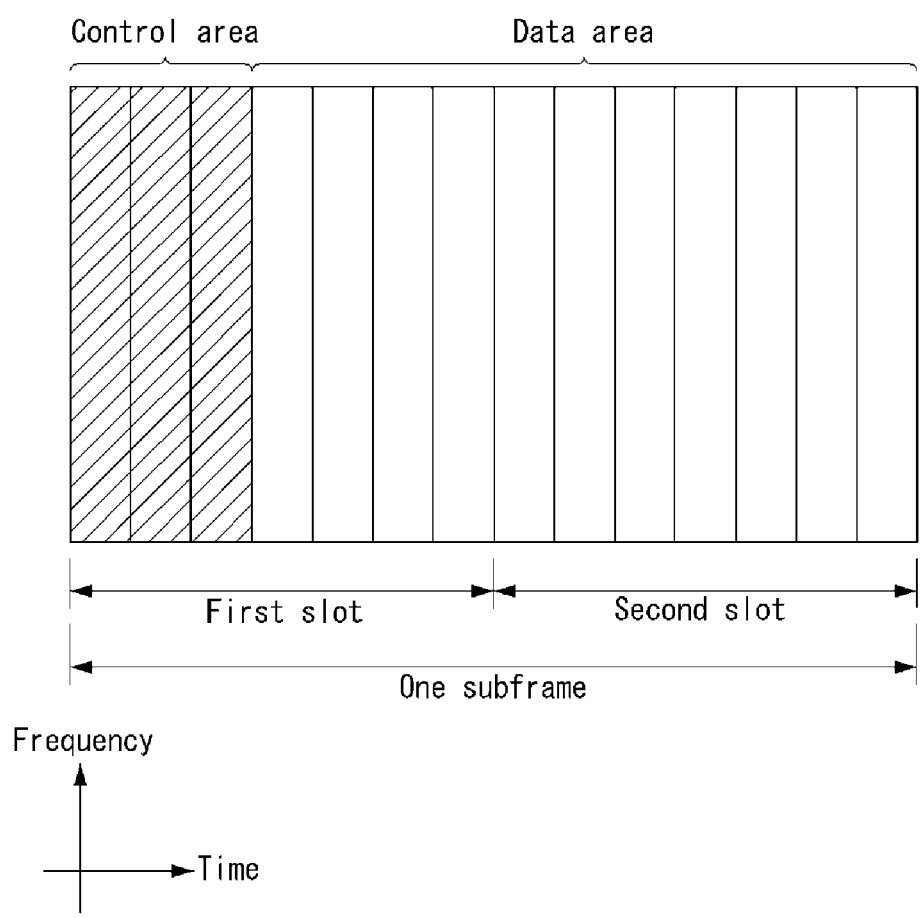

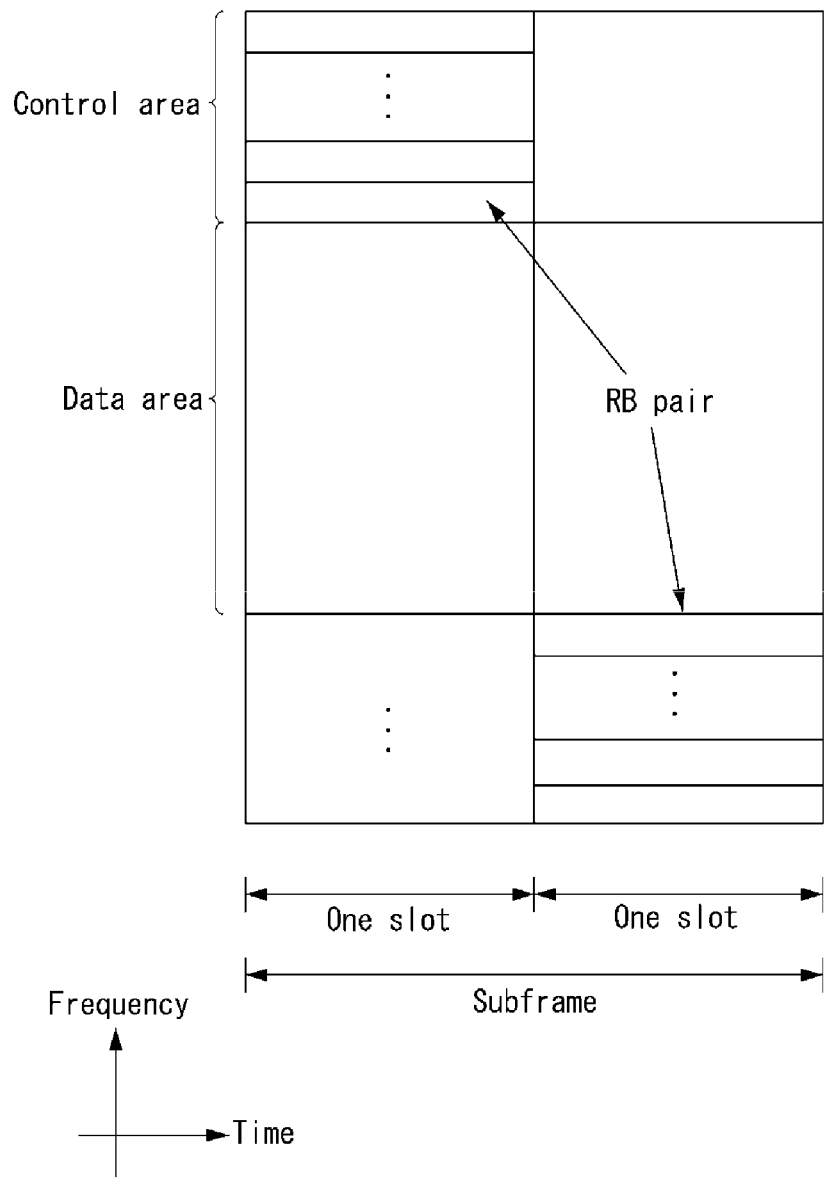
[Figure 4]

【Figure 5】
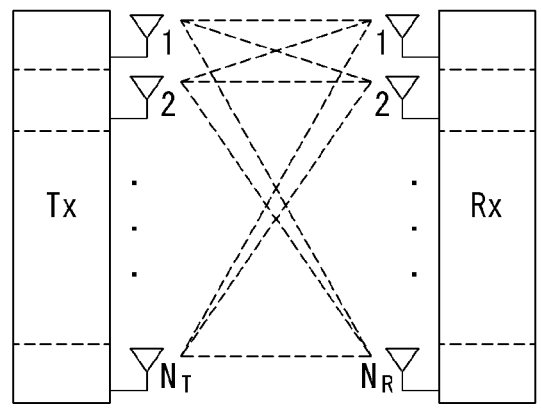
【Figure 6】
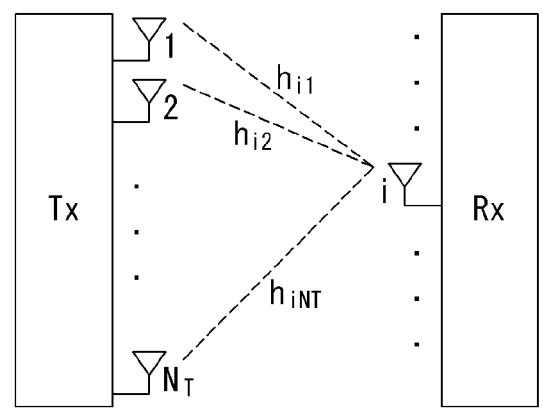

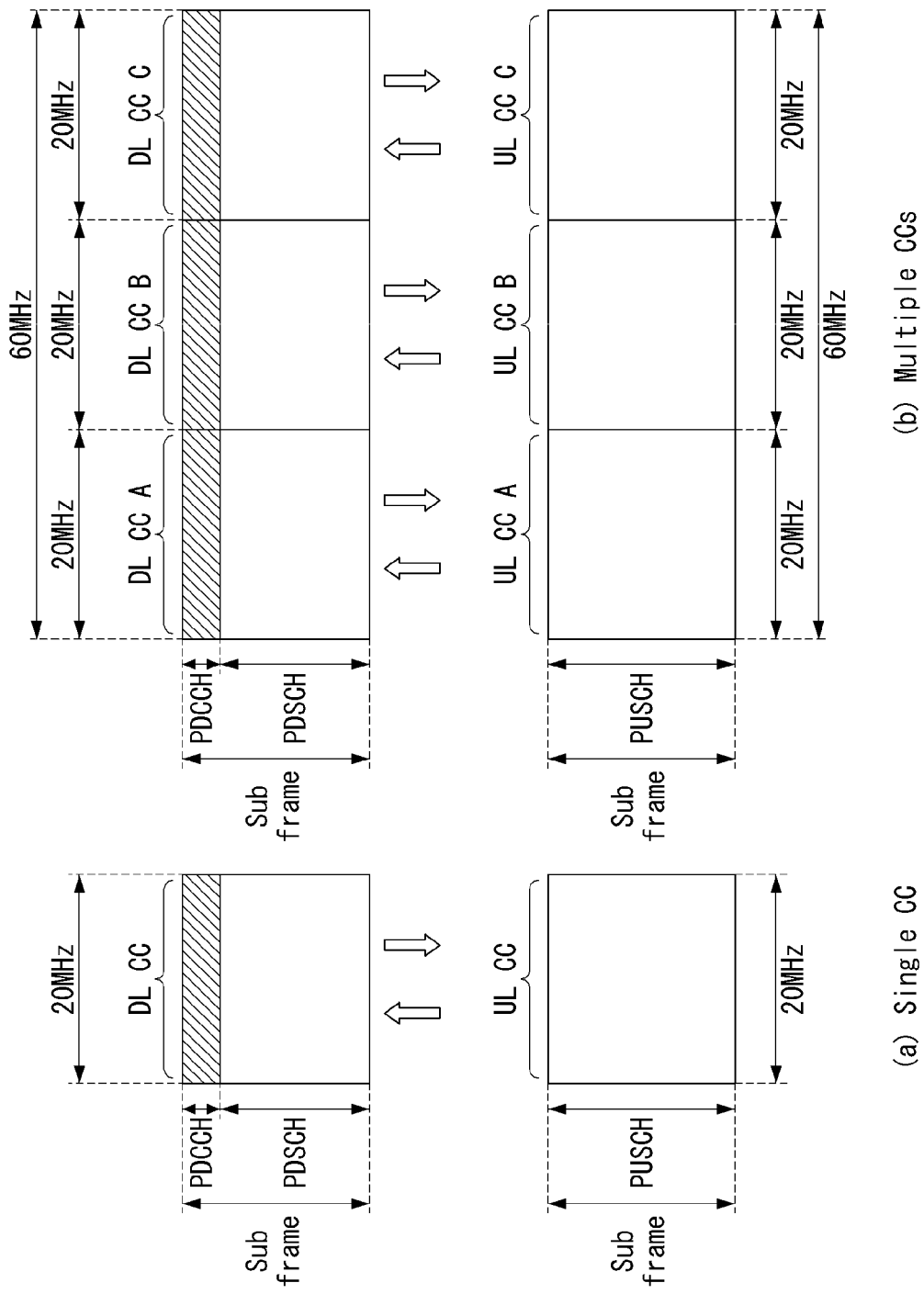
[Figure 7]

[Figure 8]
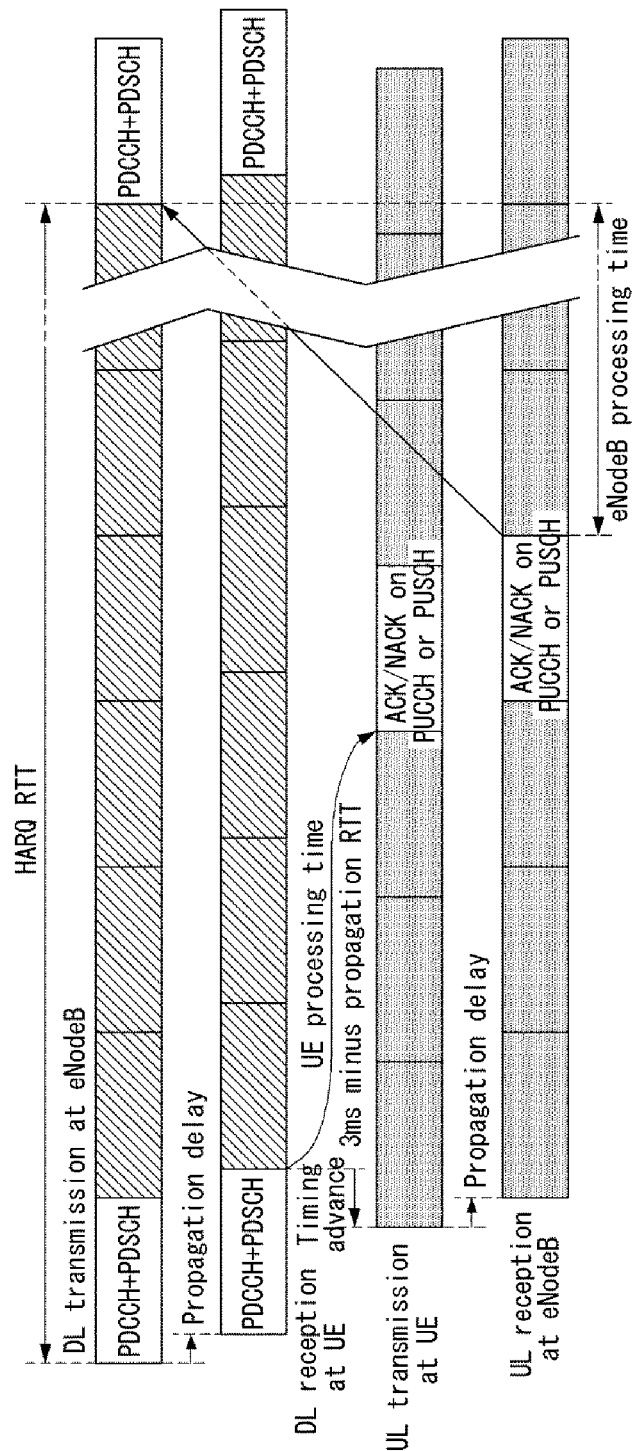

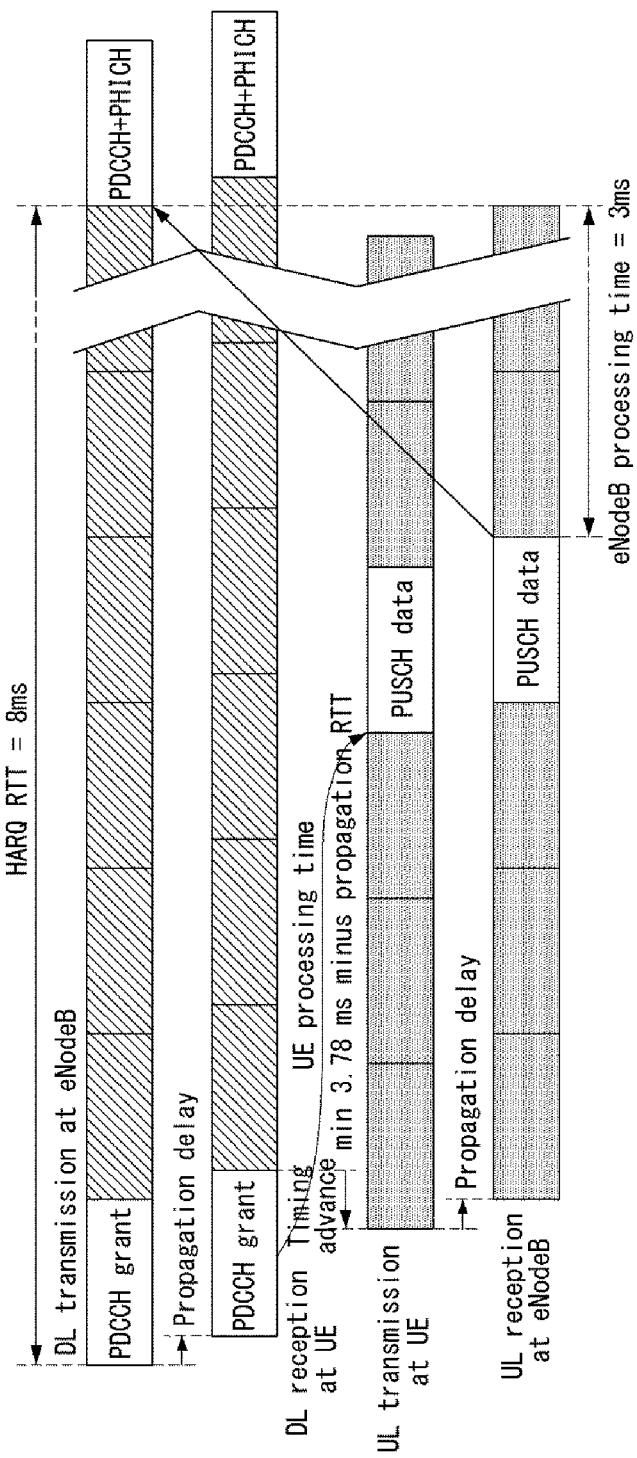
[Figure 9]

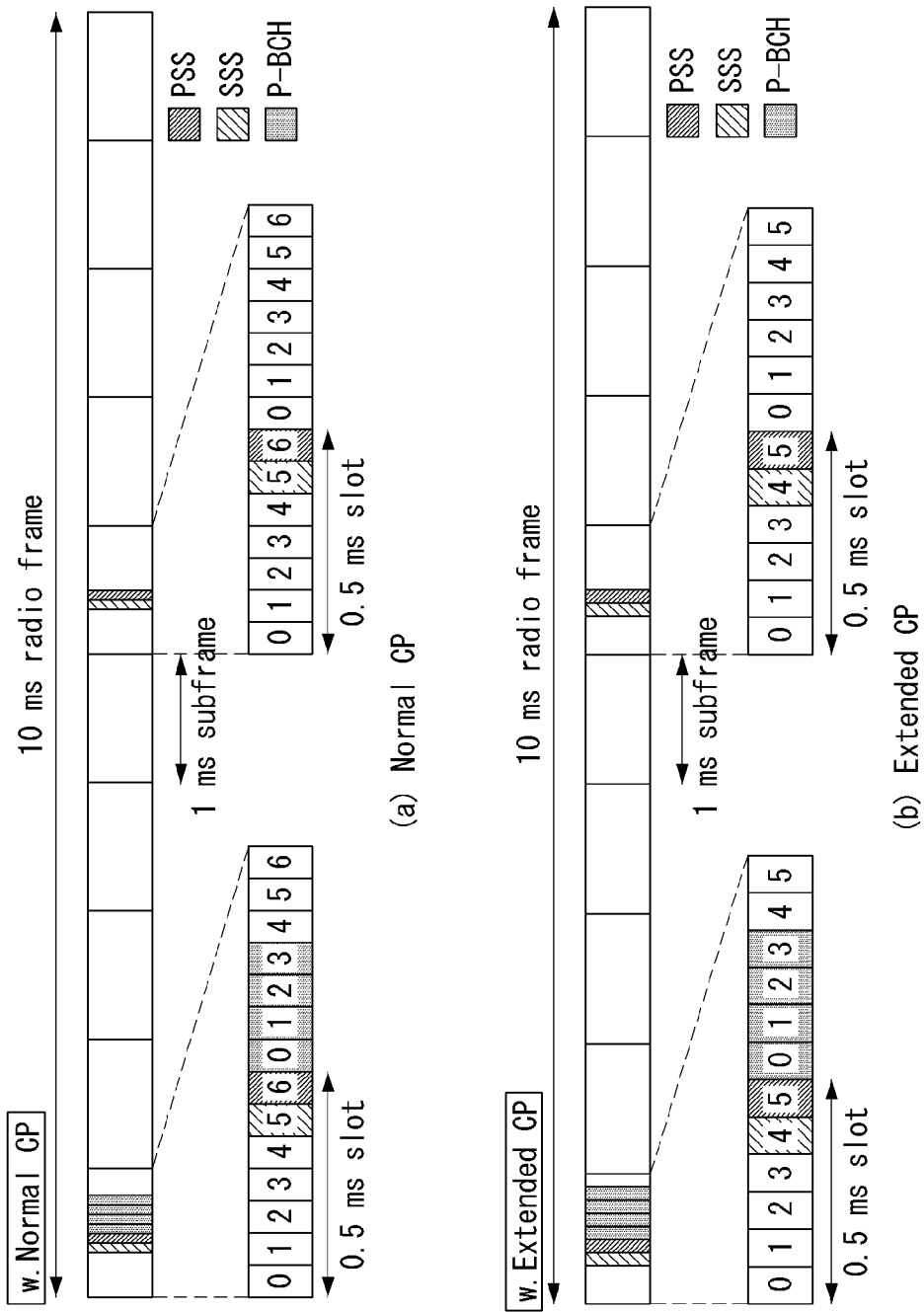
[Figure 10]

[Figure 11]
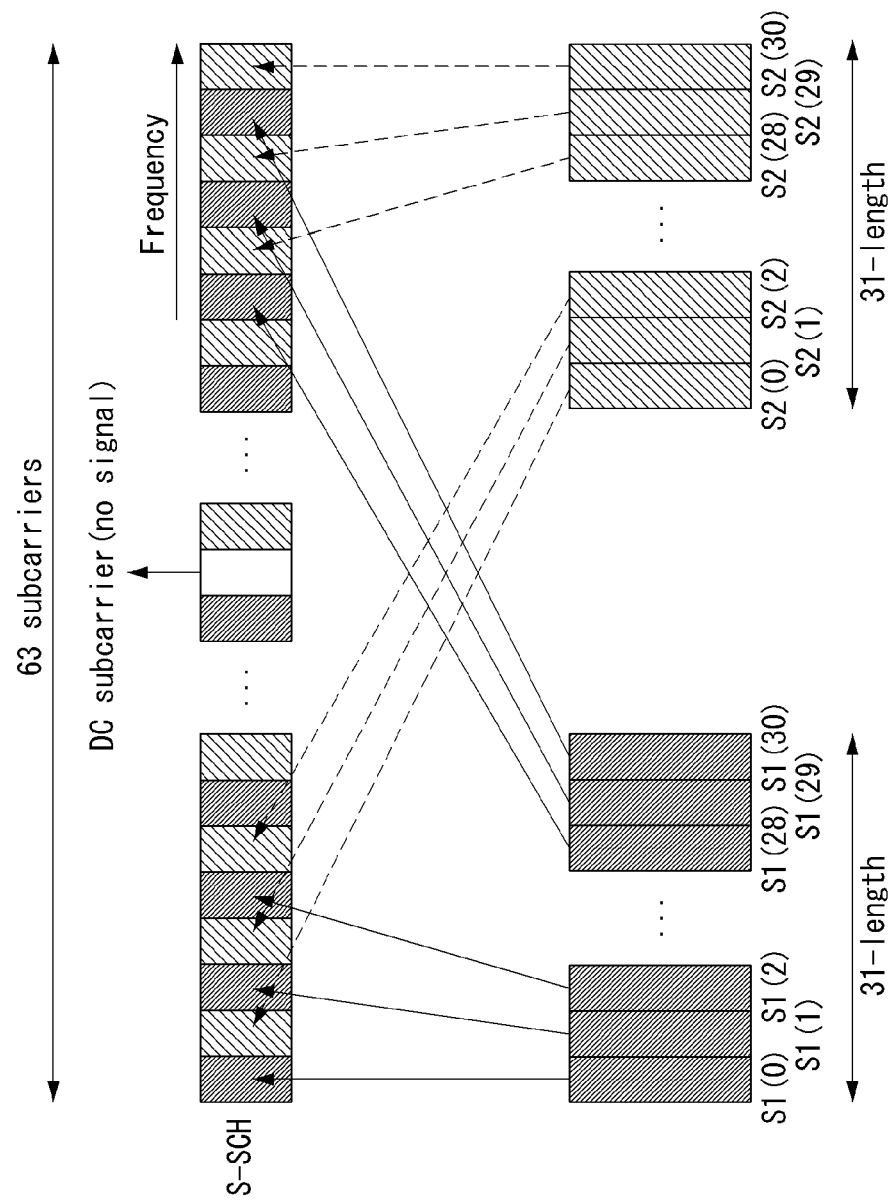

[Figure 12]
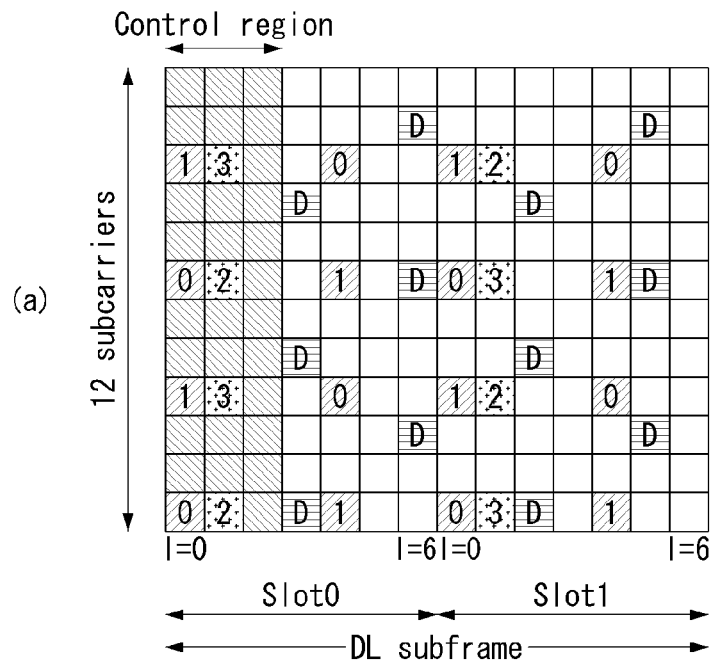
(a)
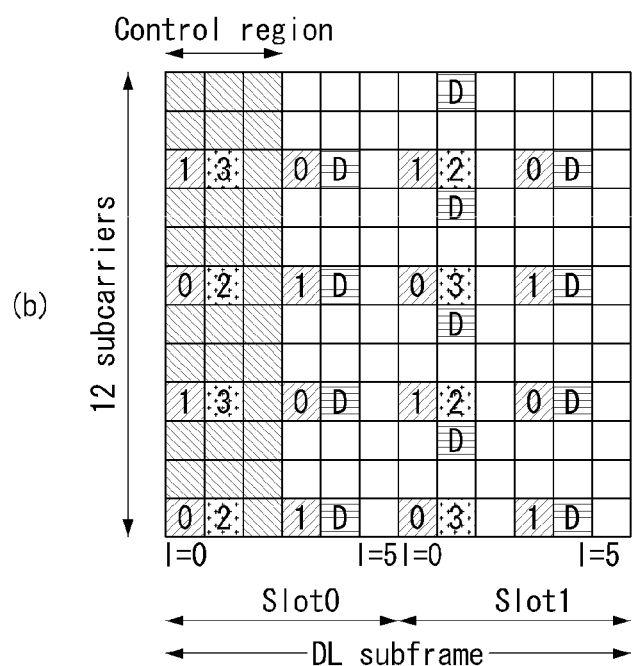
(b)

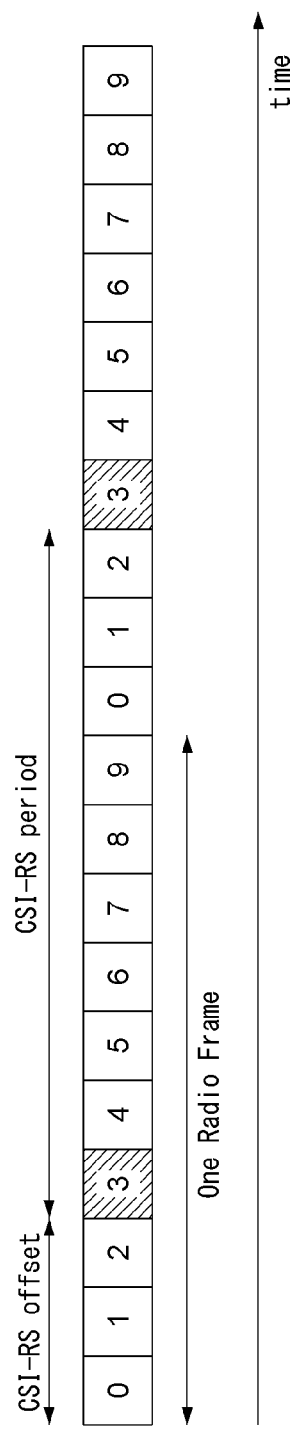
[Figure 13]

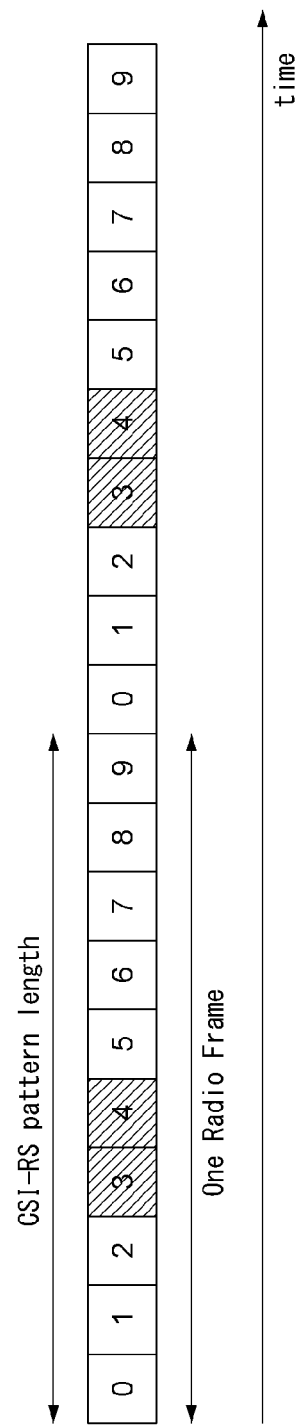
[Figure 14]

[Figure 15]
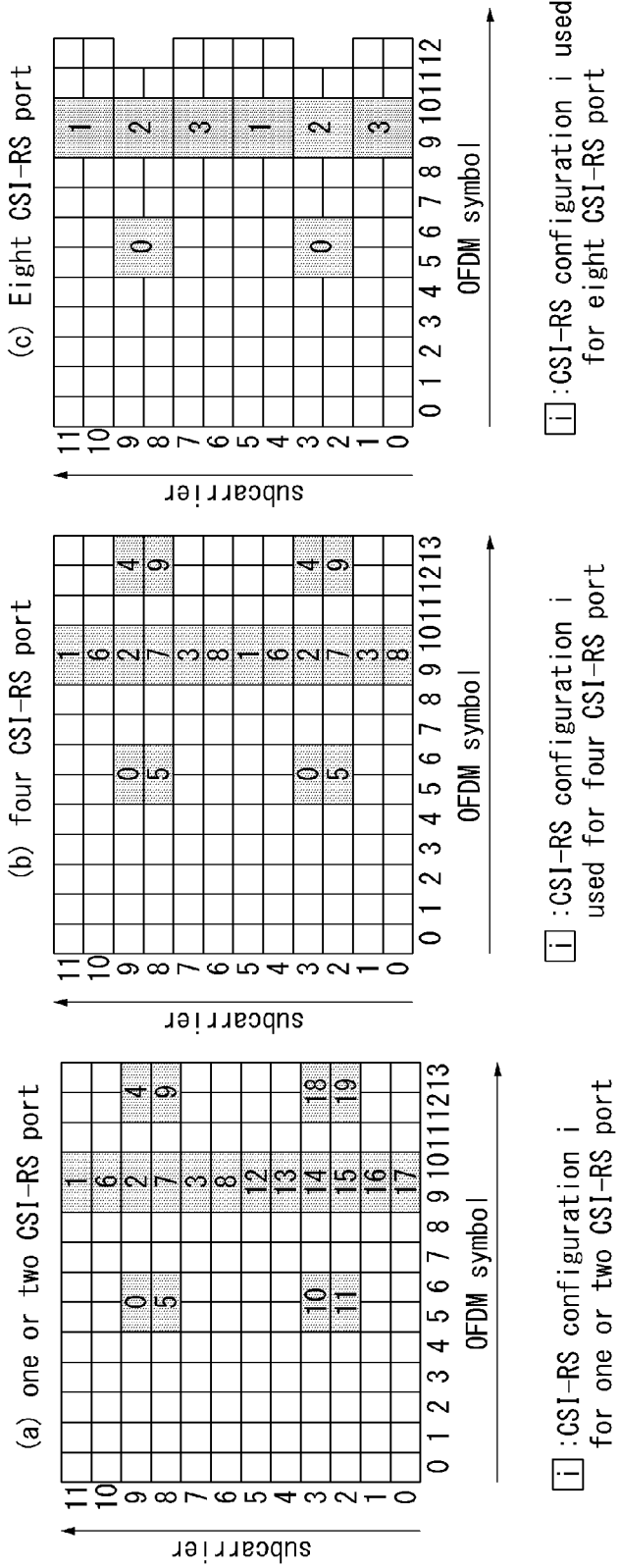

[Figure 16]
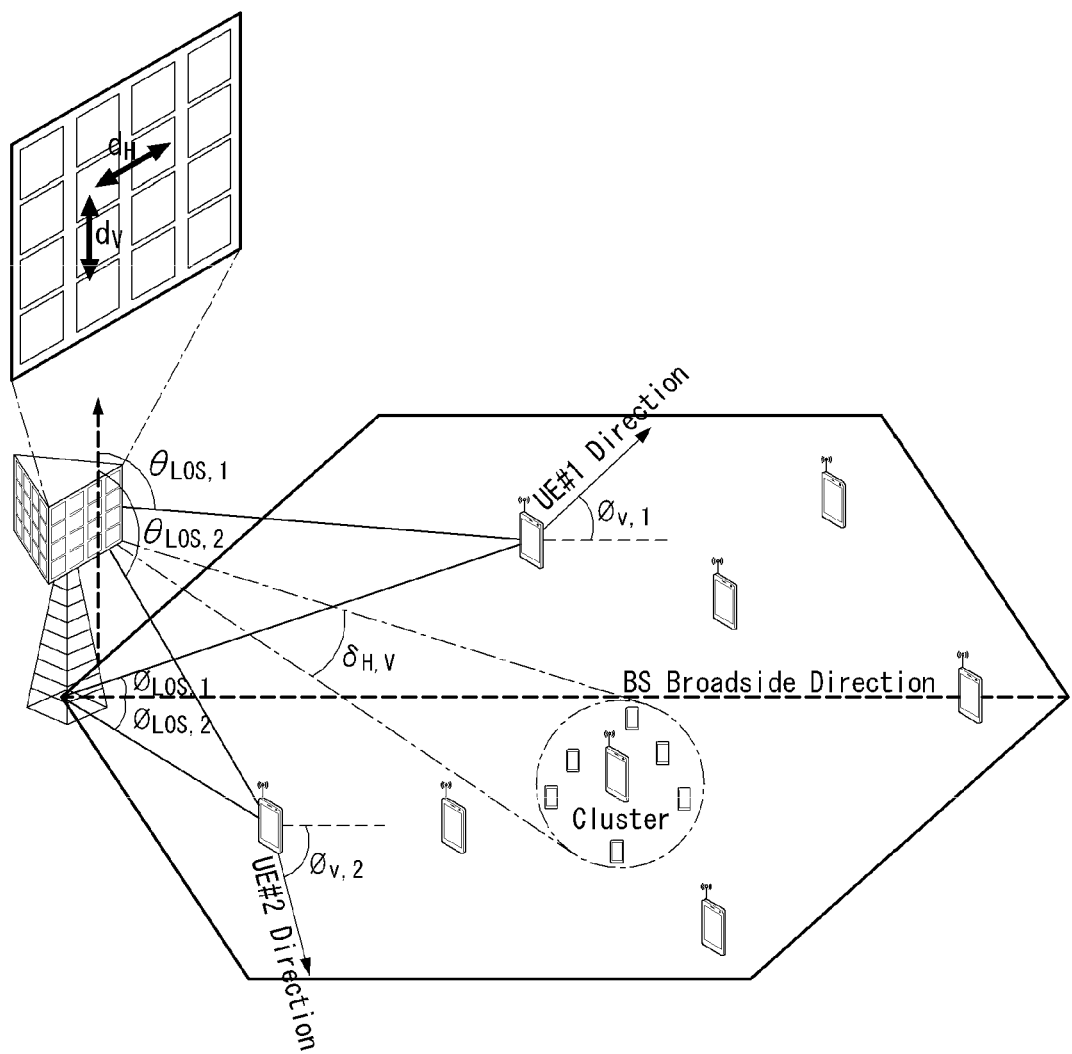

[Figure 17]
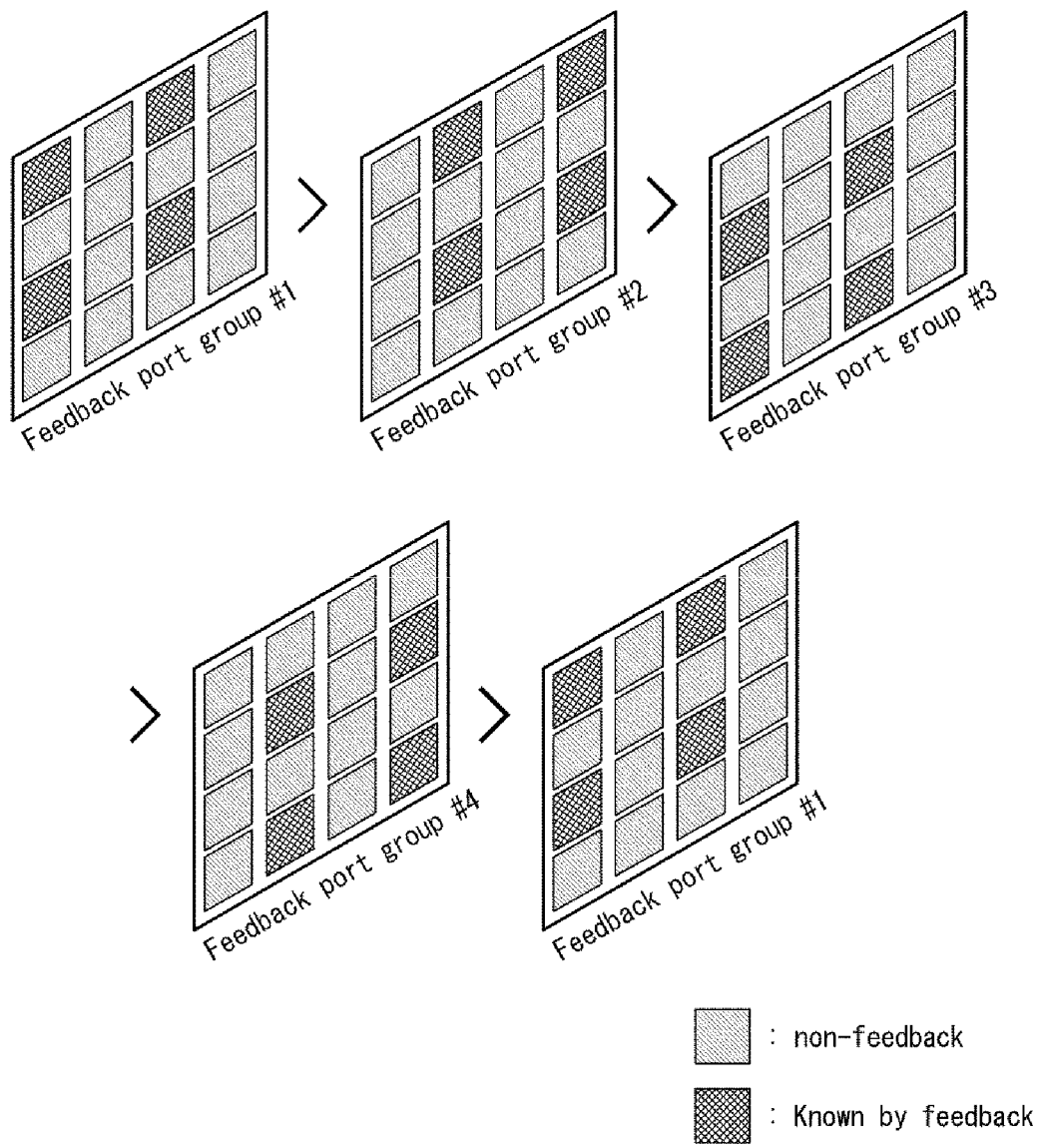

【Figure 18】
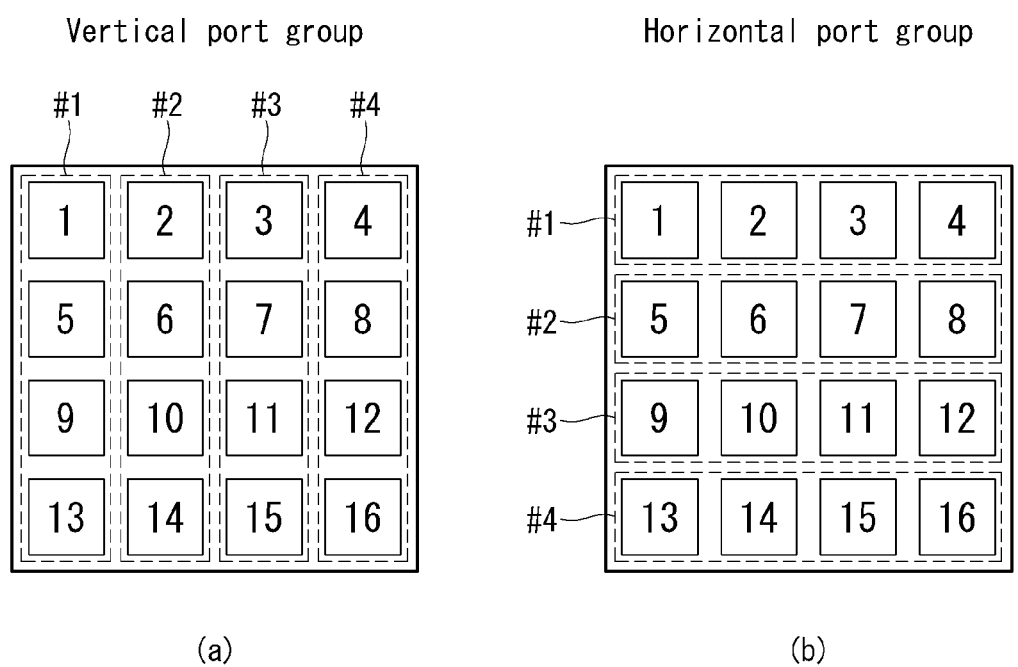
(a) Vertical port group
(b) Horizontal port group

[Figure 19]
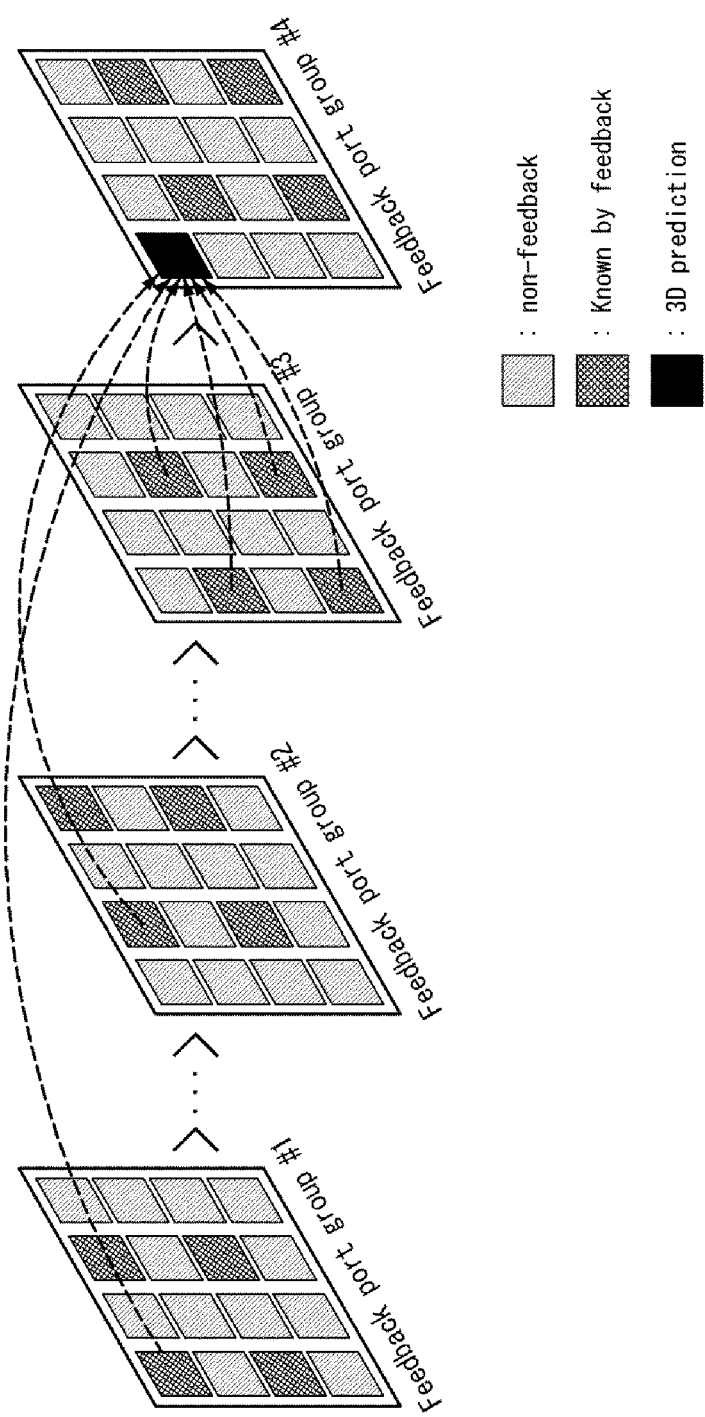

[Figure 20]
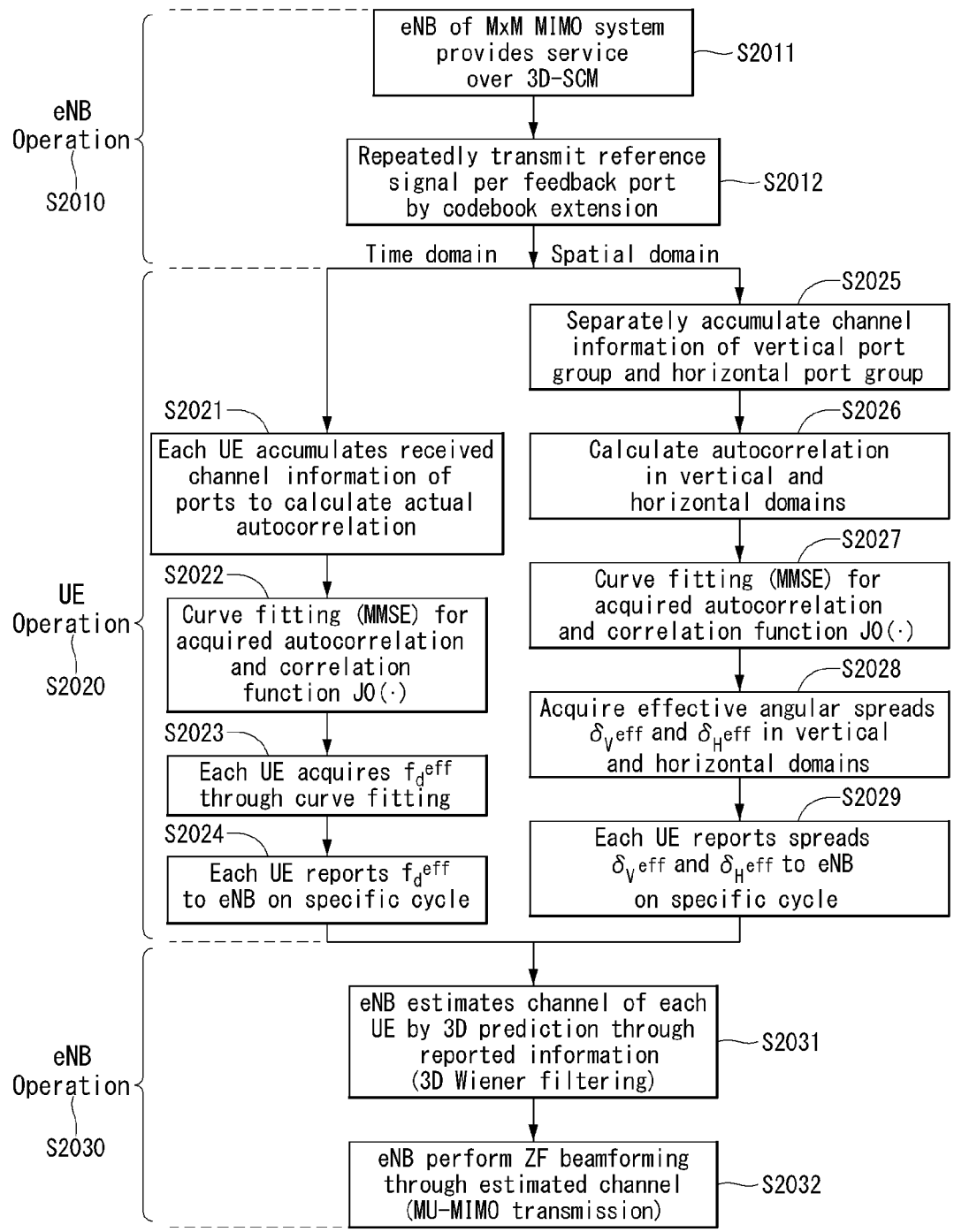

[Figure 21]
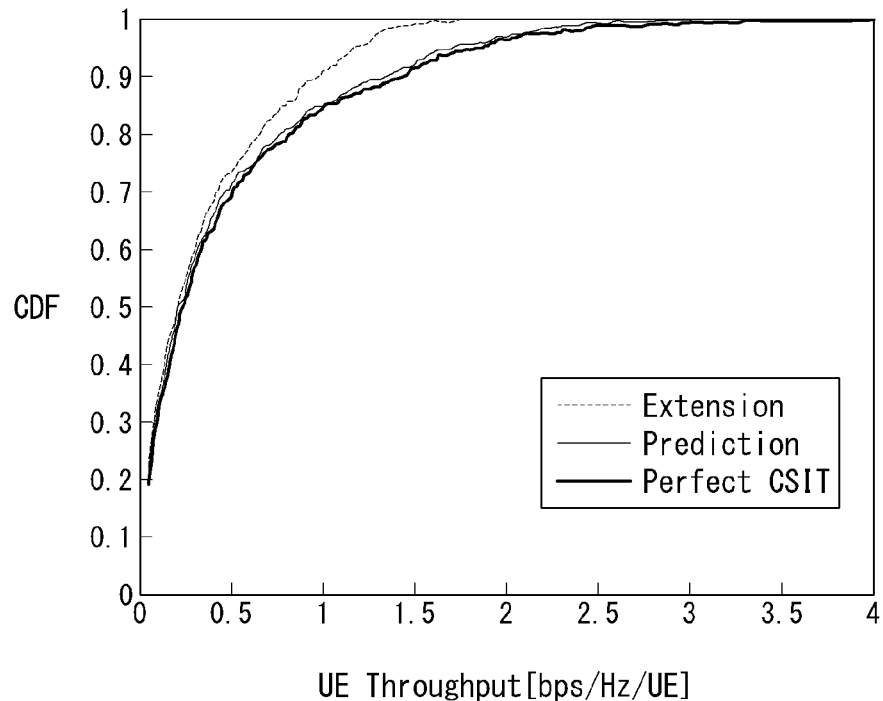
[Figure 22]
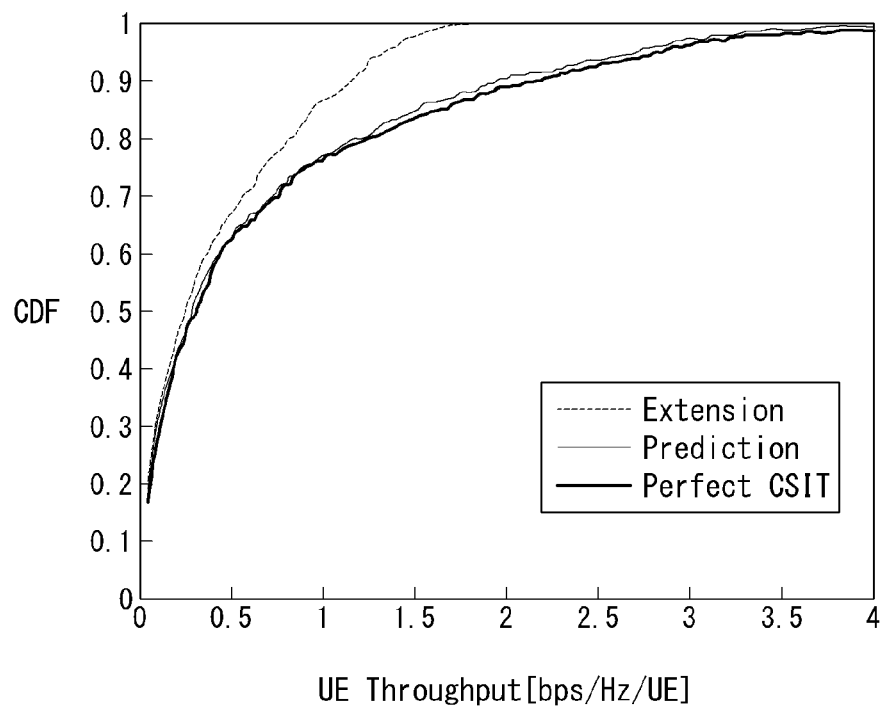

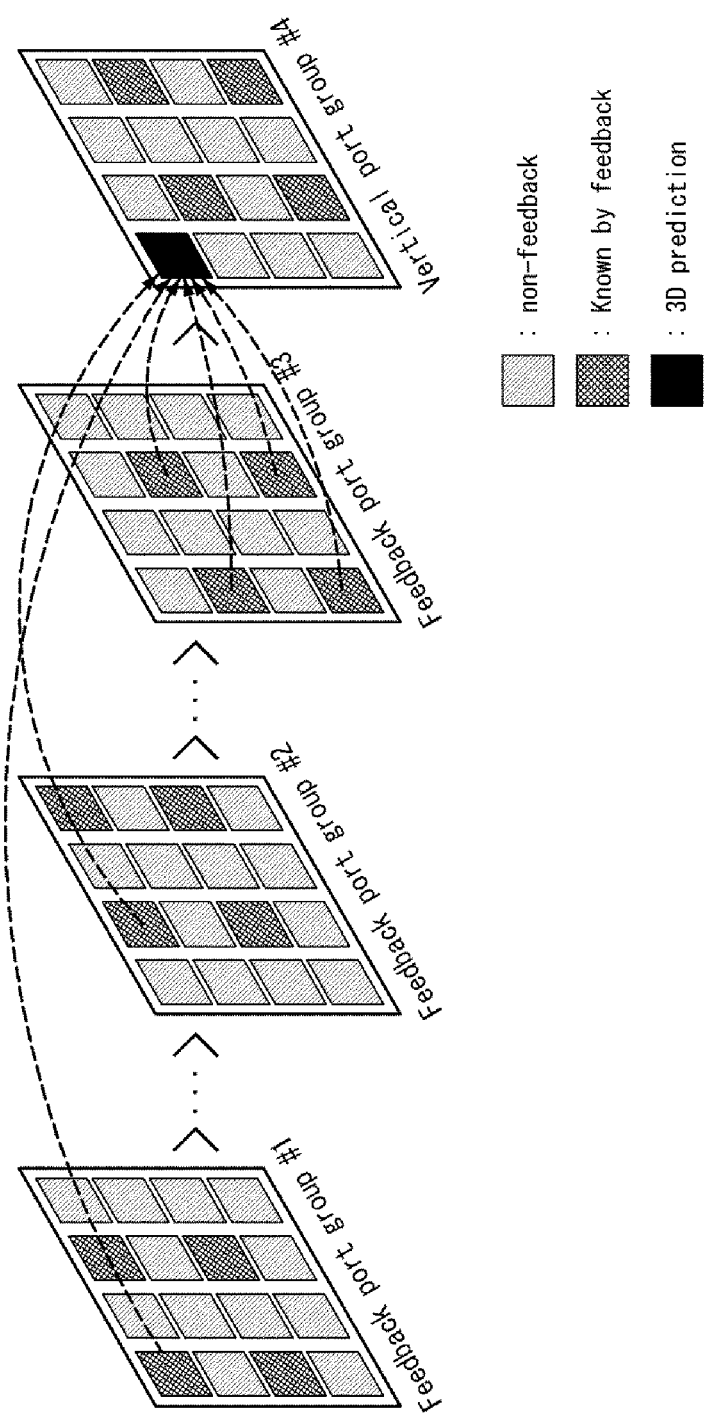
[Figure 23]

【Figure 24】
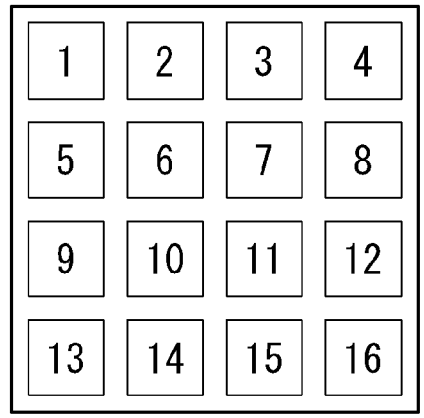
【Figure 25】
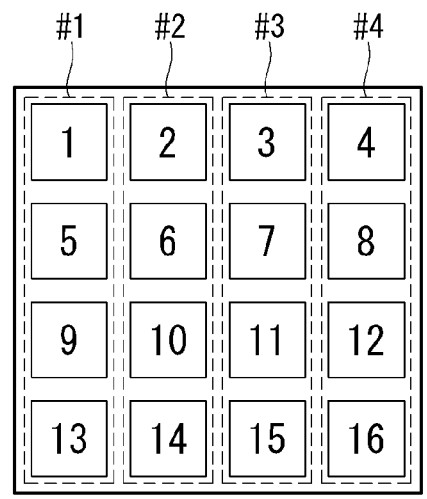

【Figure 26】
$$V = \begin{bmatrix} e^{j\theta_1^1} & 0 & 0 & 0 \\ 0 & e^{j\theta_2^1} & 0 & 0 \\ 0 & 0 & e^{j\theta_3^1} & 0 \\ 0 & 0 & 0 & e^{j\theta_4^1} \\ e^{j\theta_1^2} & 0 & 0 & 0 \\ 0 & e^{j\theta_2^2} & 0 & 0 \\ 0 & 0 & e^{j\theta_3^2} & 0 \\ 0 & 0 & 0 & e^{j\theta_4^2} \\ e^{j\theta_1^3} & 0 & 0 & 0 \\ 0 & e^{j\theta_2^3} & 0 & 0 \\ 0 & 0 & e^{j\theta_3^3} & 0 \\ 0 & 0 & 0 & e^{j\theta_4^3} \\ e^{j\theta_1^4} & 0 & 0 & 0 \\ 0 & e^{j\theta_2^4} & 0 & 0 \\ 0 & 0 & e^{j\theta_3^4} & 0 \\ 0 & 0 & 0 & e^{j\theta_4^4} \end{bmatrix}$$
【Figure 27】
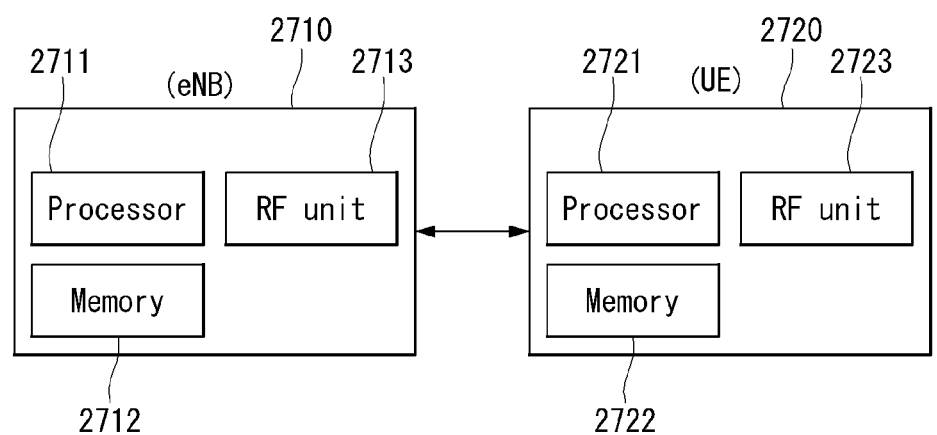

METHOD FOR PERFORMING CHANNEL ESTIMATION IN WIRELESS COMMUNICATION SYSTEM AND APPARATUS THEREFOR

CROSS REFERENCE TO RELATED APPLICATIONS

This application is the National Phase of PCT International Application No. PCT/KR2015/013954, filed on Dec. 18, 2015, which claims priority under 35 U.S.C. 119(e) to U.S. Provisional Application No. 62/098,308, filed on Dec. 30, 2014, all of which are hereby expressly incorporated by reference into the present application.

TECHNICAL FIELD

The present invention relates to a wireless communication system, and more specifically, to a method for performing channel estimation in a wireless communication system and an apparatus supporting the same.

BACKGROUND ART

Mobile communication systems have been developed in order to provide audio services while securing user mobility. While mobile communication systems extend services to data services in addition to audio services, current explosive traffic increase causes resource shortage and users require faster services. Accordingly, enhanced mobile communication systems are needed.

Future mobile communication systems need to accept explosive data traffic and a considerably increased number of connected devices, remarkably increase throughput per user, have very low end-to-end latency and support high energy efficiency. To this end, various technologies such as dual connectivity, massive MIMO (Massive Multiple Input Multiple Output), in-band full duplex, NOMA (Non-Orthogonal Multiple Access), super wideband and device networking are researched.

DISCLOSURE

Technical Problem

An object of the present description is to provide a three-dimensional channel estimation method through acquisition of autocorrelation in time/spatial domains for accumulated channels in order to minimize estimation error of time-varying radio channels.

In addition, an object of the present description is to provide a method by which a UE receives information related to three-dimensional channel estimation for a time in the future and performs three-dimensional channel estimation.

Furthermore, an object of the present description is to provide a method of performing three-dimensional channel estimation for a plurality of points of time or only for a specific time from among the plurality of points of time and feeding back the three-dimensional channel estimation result to an eNB.

Moreover, an object of the present description is to provide a method of feeding back channel state information about specific antenna ports from among all antenna ports of an eNB.

The technical problems solved by the present invention are not limited to the above technical problems and other technical problems which are not described herein will become apparent to those skilled in the art from the following description.

Technical Solution

A method for performing, by a UE, channel estimation in a wireless communication system includes: receiving, from an eNB, a control message including reference signal transmission pattern information representing a transmission pattern of a channel estimation reference signal (RS) transmitted through antenna ports; receiving the reference signal from the eNB on the basis of the received reference signal transmission pattern information; measuring a channel per antenna port of the eNB on the basis of the received reference signal; and feeding back channel state information related to the measured channel to the eNB.

The reference signal transmission pattern may be a form in which L reference signals are transmitted through different antenna ports over K cycles at a specific time.

The control message may include at least one of transmission cycle and offset information related to transmission times of the L reference signals, sequence scrambling information of each reference signal and transmission resource information of each reference signal.

The specific time is a time on a subframe-by-subframe basis, a symbol-by-symbol basis or a radio frame-by-radio frame basis.

The measuring of the channel per antenna port of the eNB may include: accumulating the measured channel information; and acquiring autocorrelation in the time domain and/or the spatial domain on the basis of the accumulated channel information.

The method may further include: calculating parameters related to 3D channel estimation; and transmitting the calculated parameters to the eNB.

The calculated parameters may be transmitted along with the channel state information to the eNB.

The 3D channel estimation may be performed through Wiener filtering.

The acquiring of autocorrelation in the time domain may include acquiring a Doppler frequency $f_d$ according to mobility of the UE.

The acquiring of the Doppler frequency $f_d$ may use the autocorrelation according to the accumulated channel information and autocorrelation acquired by a Bessel function.

The acquiring of autocorrelation in the spatial domain may include: measuring channels for a first group of antenna ports and a second group of antenna ports, the first group being a horizontal group of L antenna ports, the second group being a vertical group of L antenna ports; accumulating channel information regarding antenna ports, measured per group; acquiring autocorrelation for antenna ports in the first group and autocorrelation for antenna ports in the second group; and acquiring an angular spread per group on the basis of the acquired autocorrelation.

The method may include: receiving, from the eNB, channel estimation time information indicating a time when the 3D channel estimation will be performed; and performing the 3D channel estimation on the basis of the received channel estimation time information.

The channel estimation time information may be received from the NB through RRC signaling or downlink control information (DCI).

The 3D channel estimation may be performed at multiple specific times, and 3D channel information estimated at the multiple specific times may be transmitted to the eNB.

The 3D channel estimation may be performed only at one of multiple specific times, and 3D channel information estimated at the specific time may be transmitted to the eNB at each of the multiple specific times or transmitted to the eNB only at the specific time.

The number of antenna ports of the eNB may be M, the 3D channel estimation may be performed for some of the M antenna ports, and 3D channel information estimated for the some antenna ports may be transmitted to the eNB.

The method may further include receiving, from the eNB, information related to the some antenna ports for which the 3D channel estimation is performed.

The some antenna ports may be virtualized, the virtualization referring to receiving of the same reference signal through the some antenna ports, and the method may further include receiving virtualization matrix information related to the virtualization from the eNB, wherein independent beam coefficients for antenna ports are applied to the virtualization matrix information.

The some antenna ports may be composed of multiple CSI (Channel Status Information)-RS (Reference Signal) port groups, and the method may further include: receiving, from the eNB, CSI-RS configuration information related to the CSI-RS port groups; performing 3D channel estimation for the CSI-RS port groups on the basis of the received CSI-RS configuration information; generating new channel state information by multiplying the estimated CSI-RS port groups by different weight coefficients; and transmitting the newly generated channel state information to the eNB.

A UE for performing channel estimation in a wireless communication system includes: an RF (Radio Frequency) unit for transmitting and receiving radio signals; and a processor functionally connected to the RF unit and controlling the UE, wherein the processor is configured: to receive, from an eNB, a control message including reference signal transmission pattern information representing a transmission pattern of a channel estimation reference signal (RS) transmitted through antenna ports; to receive the reference signal from the eNB on the basis of the received reference signal transmission pattern information; to measure a channel per antenna port of the eNB on the basis of the received reference signal; and to feed back channel state information related to the measured channel to the eNB.

Advantageous Effects

According to the present description, it is possible to enhance resource efficiency of a mobile communication system by limiting channel estimation error to a specific level even as the number of antenna elements increases.

Furthermore, according to the present description, it is possible to achieve flexible technology introduction and commercialization and enhance data throughput through the method proposed in consideration of current mobile communication system standards.

Moreover, the present description can be directly applied to massive MIMO using large-scale array antennas including normal MIMO, thereby performing fast data transmission through multiple antennas with low feedback resource consumption.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention.

FIG. 1 illustrates a radio frame structure in a wireless communication system to which the present invention is applicable.

FIG. 2 illustrates a resource grid for a single downlink slot in a wireless communication system to which the present invention is applicable.

FIG. 3 illustrates a downlink subframe structure in a wireless communication system to which the present invention is applicable.

FIG. 4 illustrates an uplink subframe structure in a wireless communication system to which the present invention is applicable.

FIG. 5 illustrates a configuration of a normal MIMO communication system.

FIG. 6 illustrates channels from a plurality of transmitting antennas to a single receiving antenna.

FIG. 7 illustrates examples of component carriers and carrier aggregation in a wireless communication system to which the present invention is applicable.

FIG. 8 illustrates a downlink HARQ process in an LTE FDD system to which the present invention is applicable.

FIG. 9 illustrates an uplink HARQ process in an LTE FDD system to which the present invention is applicable.

FIG. 10 illustrates a radio frame configuration for transmission of a synchronization signal in a wireless communication system to which the present invention is applicable.

FIG. 11 illustrates a secondary synchronization signal structure in a wireless communication system to which the present invention is applicable.

FIG. 12 illustrates reference signal patterns matched to downlink resource block pairs in a wireless communication system to which the present invention is applicable.

FIG. 13 illustrates a periodic CSI-RS transmission scheme in a wireless communication system to which the present invention is applicable.

FIG. 14 illustrates an aperiodic CSI-RS transmission scheme in a wireless communication system to which the present invention is applicable.

FIG. 15 illustrates a CSI-RS configuration in a wireless communication system to which the present invention is applicable.

FIG. 16 is a schematic diagram of a wireless communication system to which methods proposed in the present description are applicable.

FIG. 17 illustrates an example of a feedback antenna port configuration when the number of logical antenna ports proposed in the present description is 16.

FIG. 18 illustrates examples of vertical and horizontal antenna port groups to which methods proposed in the present description are applicable.

FIG. 19 illustrates the concept of a three-dimensional channel estimation method proposed in the present description.

FIG. 20 is a flowchart illustrating an example of operations of an eNB and a UE to perform the three-dimensional channel estimation method proposed in the present description.

FIG. 21 illustrates throughput when an antenna spacing is 0.5λ and FIG. 22 illustrates throughput when an antenna spacing is 2λ.

FIG. 23 illustrates an example of a three-dimensional channel estimation method for a time in the future proposed in the present description.

FIG. 24 illustrates an example of a physical antenna port arrangement of an eNB to which methods proposed in the present description are applicable.

FIG. 25 illustrates an example of a virtual antenna port arrangement to which methods proposed in the present description are applicable.

FIG. 26 illustrates an example of a virtualization matrix to which methods proposed in the present description are applicable.

FIG. 27 is a block diagram of a wireless communication apparatus according to an embodiment of the present invention.

BEST MODES

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(*a*) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(*b*) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows he uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 sub-carriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary.

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using multiple input multiple output antennas at a transmitter side or a receiver side of the wireless communication system. Hereinafter, "MIMO" will be referred to as "multiple input multiple output antennas".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

FIG. 5 is a configuration diagram of a general multiple input multiple output (MIMO) communication system.

Referring to FIG. 5, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epochally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \qquad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 5.

First, in respect to a transmission signal, when NT transmitting antennas are provided, since the maximum number of transmittable information is NT, NT may be expressed as a vector given below.

$$s=[s_1,s_2,\ldots,s_{N_T}]^T \quad \text{[Equation 2]}$$

Meanwhile, transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \quad \text{[Equation 3]}$$

Further, $\hat{s}$ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector $\hat{s}$ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, . . . xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, . . . , yNR of the respective antennas are expressed as a vector y as described below.

$$y=[y_1,y_2,\ldots,y_{N_R}]^T \quad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

FIG. 6 is a diagram illustrating a channel from multiple transmitting antennas to one receiving antenna.

As illustrated in FIG. 6, a channel which reaches receiving antenna I from a total of NT transmitting antennas may be expressed as below.

$$h_i^T=[h_{i1},h_{i2},\ldots,h_{iN_T}] \quad \text{[Equation 7]}$$

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Meanwhile, since additive white Gaussian noise (AWGN) is added after passing through a channel matrix H given above in an actual channel, white noises n1, n2, . . . , nNR added to NR receiving antennas, respectively are expressed as below.

$$n=[n_1,n_2,\ldots,n_{N_R}]^T \quad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx+n$$

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R) \qquad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 7 illustrates examples of a component carrier and carrier aggregation in the wireless communication system to which the present invention can be applied.

FIG. 7a illustrates a single carrier structure used in an LTE system. The component carrier includes the DL CC and the UL CC. One component carrier may have a frequency range of 20 MHz.

FIG. 7b illustrates a carrier aggregation structure used in the LTE system. In the case of FIG. 7b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (N≤M) DL CCs to the terminal. In this case, the terminal may monitor only M limited DL CCs and receive the DL signal. Further, the network gives L (L≤W≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Coordinated Multi-point Transmission and Reception (COMP)

According to a demand of LTE-advanced, CoMP transmission is proposed in order to improve the performance of the system. The CoMP is also called co-MIMO, collaborative MIMO, network MIMO, and the like. It is anticipated that the CoMP will improves the performance of the terminal positioned at a cell edge and improve an average throughput of the cell (sector).

In general, inter-cell interference decreases the performance and the average cell (sector) efficiency of the terminal positioned at the cell edge in a multi-cell environment in which a frequency reuse index is 1. In order to alleviate the inter-cell interference, the LTE system adopts a simple passive method such as fractional frequency reuse (FFR) in the LTE system so that the terminal positioned at the cell edge has appropriate performance efficiency in an interference-limited environment. However, a method that reuses the inter-cell interference or alleviates the inter-cell interference as a signal (desired signal) which the terminal needs to receive is more preferable instead of reduction of the use of the frequency resource for each cell. The CoMP transmission scheme may be adopted in order to achieve the aforementioned object.

The CoMP scheme which may be applied to the downlink may be classified into a joint processing (JP) scheme and a coordinated scheduling/beamforming (CS/CB) scheme.

In the JP scheme, the data may be used at each point (base station) in a CoMP wise. The CoMP wise means a set of base stations used in the CoMP scheme. The JP scheme may be again classified into a joint transmission scheme and a dynamic cell selection scheme.

The joint transmission scheme means a scheme in which the signal is simultaneously transmitted through a plurality of points which are all or fractional points in the CoMP wise. That is, data transmitted to a single terminal may be simultaneously transmitted from a plurality of transmission points. Through the joint transmission scheme, the quality of the signal transmitted to the terminal may be improved regardless of coherently or non-coherently and interference with another terminal may be actively removed.

The dynamic cell selection scheme means a scheme in which the signal is transmitted from the single point through the PDSCH in the CoMP wise. That is, data transmitted to the single terminal at a specific time is transmitted from the single point and data is not transmitted to the terminal at another point in the CoMP wise. The point that transmits the data to the terminal may be dynamically selected.

According to the CS/CB scheme, the CoMP wise performs beamforming through coordination for transmitting the data to the single terminal. That is, the data is transmitted to the terminal only in the serving cell, but user scheduling/beamforming may be determined through coordination of a plurality of cells in the CoMP wise.

In the case of the uplink, CoMP reception means receiving the signal transmitted by the coordination among a plurality of points which are geographically separated. The CoMP scheme which may be applied to the uplink may be classified into a joint reception (JR) scheme and the coordinated scheduling/beamforming (CS/CB) scheme.

The JR scheme means a scheme in which the plurality of points which are all or fractional points receives the signal transmitted through the PDSCH in the CoMP wise. In the CS/CB scheme, only the single point receives the signal transmitted through the PDSCH, but the user scheduling/beamforming may be determined through the coordination of the plurality of cells in the CoMP wise.

Hybrid—Automatic Repeat and Request (HARQ)

The LTE physical layer supports the HARQ in the PDSCH and the PUSCH, and transmits the related acknowledgement (ACK) feedback in a separate control channel.

In the LTE FDD system, eight Stop-And-Wait (SAW) HARQ processes are supported on both the uplink and the downlink in accordance with a constant round-trip time (RTT) of 8 ms.

FIG. 8 is a diagram illustrating a downlink HARQ process in an LTE FDD system, and FIG. 9 is a diagram illustrating an uplink HARQ process in an LTE FDD system.

The respective HARQ processes are defined by a unique HARQ process identifier of 3 bit size, and individual soft buffer allocation for combination of retransmitted data is required for a reception end (that is, UE at the downlink HARQ process, and eNodeB at the uplink HARQ process).

In addition, it is defined that information such as a new data indicator (NDI), a redundancy version (RV) and a modulation and coding scheme (MCS) fields in the downlink control information for the HARQ processes. The NDI field is toggled whenever a new packet transmission is started. The RV field indicates the RV that is selected for a transmission and a retransmission. The MCS field indicates a modulation and coding method level.

The downlink HARQ process of the LTE system is an adaptive asynchronous scheme. Accordingly, the downlink control information for the HARQ process is explicitly accompanied per downlink transmission.

On the other hand, the uplink HARQ process of the LTE system is a synchronous scheme, and may be performed adaptively or non-adaptively. Since the uplink non-adaptive HARQ scheme does not accompany signaling of the explicit control information, the sequence such as previously set RV sequence (i.e., 0, 2, 3, 1, 0, 2, 3, 1, . . . ) is required for a continuous packet transmission. However, according to the uplink adaptive HARQ scheme, the RV is signaled explicitly. In order to minimize the control signaling, the uplink mode in which the RV (or the MCS) is combined with other control information is also supported.

Limited Buffer Rate Matching (LBRM)

Owing to the entire memory required for saving the Log-Likelihood Ratio (LLR) in order to support the HARQ process (throughout all HARQ processes), that is, the UE HARQ soft buffer size, the complexity in the UE implement is increased.

The object of the Limited Buffer Rate Matching (LBRM) is to maintain the peak data rates and to minimize the influence on the system performance, and in addition, to decrease the UE HARQ soft buffer size. The LBRM reduces the length of virtual circular buffer of the code block segments for the transmission block (TB) that has a size greater than a predetermined size. Using the LBRM, the mother code rate for the TB becomes the function of UE soft buffer size that is allocated to the TB size and the TB. For example, for the UE category that does not support the FDD operation and the UE of the lowest category (e.g., UE categories 1 and 2 that do not support the spatial multiplexing), the limit on the buffer is transparent. That is, the LBRM does not cause the reduction of the soft buffer. In the case of the UE of high category (i.e., UE categories 3, 4 and 5), the size of soft buffer is calculated by assuming the buffer decrease of 50% that corresponds to two thirds of the mother code rate for eight HARQ processes and the maximum TB. Since an eNB knows the soft buffer capacity of a UE, the code bit is transmitted in the virtual circular buffer (VCB) that may be stored in the HARQ soft buffer of the UE for all of the given TB (re)transmissions.

Synchronization Signal (SS)

A UE performs the initial cell search procedure including acquisition of time and frequency synchronization with the cell and detection of a physical cell ID of the cell. To this end, the UE may receive, from the eNB, synchronization signals, for example, a primary synchronization signal (PSS) and a secondary synchronization signal (SSS), establish synchronization with the eNB, and acquire information such as a cell ID.

FIG. 10 illustrates a radio frame structure for transmitting the Synchronization Signal (SS) in a wireless communication system to which the present invention may be applied.

Particularly, FIG. 10 illustrates the radio frame structure for transmitting the SS and the PBCH in the frequency division duplex (FDD). FIG. 10(a) illustrates a transmission position of the SS and the PBCH in the radio frame configured with a normal cyclic prefix (CP), and FIG. 10(b) illustrates a transmission position of the SS and the PBCH in the radio frame configured with an extended CP.

SSs are divided into a PSS and an SSS. The PSS is used to obtain the time domain synchronization and/or the frequency domain synchronization such as the OFDM symbol synchronization, the slot synchronization, and so on, and the SSS is used to obtain the frame synchronization, a cell group ID and/or a CP configuration (i.e., usage information on the normal CP or the extended CP) of a cell.

Referring to FIG. 10, the PSS and the SSS in the time domain are transmitted on two OFDM symbols in every radio frame, respectively. Specifically, the SSs are transmitted on the first slot of subframe 0 and the first slot of subframe 5, respectively, in consideration of a Global System for Mobile communication (GSM) frame length, 4.6 ms, for facilitation of inter radio access technology (RAT) measurement. In particular, the PSS is transmitted on the last OFDM symbol of the first slot of subframe 0 and the last OFDM symbol of the first slot of subframe 5, and the SSS is transmitted on the second last OFDM symbol of the first slot of subframe 0 and the second last OFDM symbol of the first slot of subframe 5.

The boundary of a corresponding radio frame may be detected through the SSS. The PSS is transmitted on the last OFDM symbol of a corresponding slot, the SSS is transmitted on the immediately before the OFDM symbol of the PSS. The transmission diversity scheme of the SS uses only a single antenna port, and is not separately defined in the standard. That is, a single antenna port transmission scheme or a transmission scheme transparent to the UE (e.g., the precoding vector switching (PVS), the time switched diversity (TSTD), and the cyclic delay diversity (CDD)) may be used for the transmission diversity of the SS.

The PSS is transmitted on every 5 ms, and accordingly, the UE may recognize that the corresponding subframe is one of subframe 0 and subframe 5 by detecting the PSS, but may not specifically identify the subframe as subframe 0 or subframe 5. Accordingly, the UE is not capable of recognizing a boundary of radio frames with the PSS alone. That is, the frame synchronization cannot be acquired with the PSS alone. The UE detects the boundary of radio frames by detecting the SSS transmitted twice with different sequences in one radio frame.

In the frequency domain, the PSS and the SSS are mapped to six RBs positioned on the center of the downlink system bandwidth. In a downlink, the entire RBs includes different number of RBs (e.g., 6 RBs to 110 RBs) depending on the system bandwidth, but a UE may detect the PSS and the SSS in the same way since the PSS and the SSS are mapped to 6 RBs positioned on the center of the downlink system bandwidth.

Both of the PSS and the SSS include the sequence that has the length of 62. Accordingly, the PSS and the SSS are mapped to 62 subcarriers on the center, which are located at opposite sides of the DC subcarrier among 6 RBs, and the DC subcarrier and each of 5 subcarriers located at opposite side ends are not used.

A UE may obtain the physical layer cell ID from a specific sequence of the PSS and the SSS. That is, the combination of 3 PSSs and 168 SSSs, the SS may represent total 504 specific physical layer cell IDs.

In other words, the physical layer cell IDs are grouped into 168 physical-layer cell-ID groups that include three specific IDs in each group such that each of the physical layer cell IDs becomes a part of only one physical-layer cell-ID group. Accordingly, the physical layer cell ID Ncell ID (=3N(1) ID+N(2) ID) is specifically defined by the number N(1) ID within the range of 0 to 167 that represents the physical-layer cell-ID group and the number N(2) ID within the range of 0 to 2 that represents the physical-layer ID in the physical-layer cell-ID group.

A UE may know one of three specific physical-layer IDs by detecting the PSS and may recognize one of 168 physical layer cell IDs related to the physical-layer ID by detecting the SSS.

The SSS is generated based on the M-sequence. Each SSS sequence is generated by concatenating SSC 1 sequence and SSC 2 sequence, which is two interleaved sequences, of which length is 31 in the frequency domain. By combining two sequences, 168 cell group IDs are transmitted. The m-sequence as the SSS sequence is robust in the frequency selective environment, and may be transformed to the high-speed m-sequence using the Fast Hadamard Transform, thereby the amount of operations being decreased. In addition, the configuration of SSS using two short codes is proposed to decrease the amount of operations of UE.

FIG. 11 illustrates a structure that two sequences for generating the secondary synchronization signal are mapped in the physical region with being interleaved.

When two m-sequences used for generating the SSS sign are defined by SSS 1 and SSS 2, in the case that the SSS (SSS 1, SSS 2) of subframe 0 transmits the cell group ID with the combination, the SSS (SSS 2, SSS 1) of subframe 5 is transmitted with being swapped, thereby distinguishing the 10 ms frame boundary. In this case, the SSS sign uses the generation polynomial $x^5+x^2+1$, and total 31 signs may be generated through the circular shift.

In order to improve the reception performance, two different PSS-based sequences are defined and scrambled to the SSS, and scrambled to SSS 1 and SSS 2 with different sequences. Later, by defining the SSS 1-based scrambling sign, the scrambling is performed to SSS 2. In this case, the sign of SSS is exchanged in a unit of 5 ms, but the PSS-based scrambling sign is not exchanged. The PSS-based scrambling sign is defined by six circular shift versions according to the PSS index in the m-sequence generated from the generation polynomial $x^5+x^2+1$, and the SSS 1-based scrambling sign is defined by eight circular shift versions according to the SSS 1 index in the m-sequence generated from the generation polynomial $x^5+x^4+x^2+x^1+1$.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal (DRS) used for a data demodulation for a specific terminal. Information for demodulation and channel measurement may be provided by using the reference signals. That is, the DRS is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 12 illustrates a reference signal pattern mapped to a downlink resource block pair in the wireless communication system to which the present invention can be applied.

Referring to FIG. 12, as a unit in which the reference signal is mapped, the downlink resource block pair may be expressed by one subframe in the time domain×12 subcarriers in the frequency domain. That is, one resource block pair has a length of 14 OFDM symbols in the case of a normal cyclic prefix (CP) (FIG. 12a) and a length of 12 OFDM symbols in the case of an extended cyclic prefix (CP) (FIG. 12b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 0 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l represent the subcarrier index and the symbol index, respectively and p represents the antenna port. $N_{symb}^{DL}$ represents the number of OFDM symbols in one downlink slot and $N_{RB}^{DL}$ represents the number of cell radio resources allocated to the downlink. $n_s$ represents a slot index and, $N_{ID}^{cell}$ represents a cell ID. mod represents a modulo operation. The position of the reference signal varies depending on the $v_{shift}$ value in the frequency domain. Since $v_{shift}$ depends on the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3 k-th subcarrier and a reference signal in another cell is allocated to a 3 k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 13 shows the case of the normal CP and Equation 14 shows the case of the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PUSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PUSCH} - 1$$

$$v_{shift} = N_{ID}^{cell} \bmod 3$$

In Equations 13 and 14, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ depends on the cell ID, the position of the reference signal has various frequency shift values according to the cell.

The LTE-A system which is an evolved version of the LTE system should support maximum eight transmitting antennas for downlink transmission. Accordingly, reference signals for maximum eight transmitting antennas should also be supported. In the LTE system, since the downlink reference signals are defined for maximum four antenna ports, if the base station includes four or more downlink transmitting antennas and maximum eight downlink transmitting antennas in the LTE-A system, the reference signals for these antenna ports should be defined additionally. The reference signals for maximum eight transmitting antenna ports should be designed for two types of reference signals, i.e., the reference signal for channel measurement and the reference signal for data demodulation.

One of important considerations in designing the LTE-A system is the backward compatibility. That is, the backward compatibility means that the LTE user equipment should be operated normally even in the LTE-A system without any problem and the LTE-A system should also support such normal operation. In view of reference signal transmission, the reference signals for maximum eight transmitting antenna ports should be defined additionally in the time-frequency domain to which CRS defined in the LTE is transmitted on full band of each subframe. However, in the LTE-A system, if reference signal patterns for maximum eight transmitting antennas are added to full band per subframe in the same manner as the CRS of the existing LTE system, the RS overhead becomes too great.

Accordingly, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and a precoding matrix index (PMI), and a data demodulation-reference signal (DM-RS) for demodulation of data transmitted to eight transmitting antennas.

The CSI-RS for the channel measurement purpose is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead, the CSI-RS may intermittently be transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, an eNB should transmit the CSI-RSs for all the antenna ports. Since the transmission of CSI-RSs for up to eight transmission antenna ports in every subframe leads to too much overhead, the CSI-RSs should be transmitted intermittently along the time axis, thereby reducing CSI-RS overhead. Therefore, the CSI-RSs may be transmitted periodically at every integer multiple of one subframe, or in a predetermined transmission pattern. The CSI-RS transmission period or pattern of the CSI-RSs may be configured by the eNB.

In order to measure the CSI-RSs, a UE should have knowledge of the information for each of the CSI-RS antenna ports in the cell to which the UE belong such as the transmission subframe index, the time-frequency position of the CSI-RS resource element (RE) in the transmission subframe, the CSI-RS sequence, and the like.

In the LTE-A system, an eNB should transmit each of the CSI-RSs for maximum eight antenna ports, respectively. The resources used for transmitting the CSI-RS of different antenna ports should be orthogonal. When an eNB transmits the CSI-RS for different antenna ports, by mapping the CSI-RS for each of the antenna ports to different REs, the resources may be orthogonally allocated in the FDM/TDM scheme. Otherwise, the CSI-RSs for different antenna ports may be transmitted in the CDM scheme with being mapped to the mutually orthogonal codes.

When an eNB notifies the information of the CSI-RS to the UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

FIG. 13 illustrates a periodic transmission scheme of CSI-RS in a wireless communication system to which the present invention may be applied.

As shown in FIG. 13, for an eNB that transmits the CSI-RS, the transmission period of the corresponding eNB is 10 (ms or subframes), and the transmission offset of the CSI-RS is 3 (subframes). The eNB has different offset values such that the CSI-RS of several cells should be evenly distributed on the time. The eNB in which the CSI-RS is transmitted in the period of 10 ms has ten offset values of 0 to 9. The offset values represent the value of subframes on which the eNB that has a specific period actually starts the CSI-RS transmission. When the eNB notifies the period and the offset value of the CSI-RS to a UE, the UE measures the CSI-RS of the eNB on the corresponding position using the value and reports the information such as CQI/PMI/RI, etc. to the eNB. The all types of the information related to the CSI-RS are cell-specific information.

FIG. 14 illustrates an aperiodic transmission scheme of CSI-RS in a wireless communication system to which the present invention may be applied.

FIG. 14 exemplifies the scheme that the CSI-RS is transmitted with a transmission subframe pattern. The CSI-RS transmission pattern includes 10 subframes, and whether to transmit the CSI-RS is designated by 1 bit indicator in each subframe.

Generally, following two schemes are considered as the scheme that an eNB notifies the CSI-RS configuration to a UE.

First, a first scheme of using the Dynamic BCH (DBCH) signaling may be considered.

The first scheme is the scheme that an eNB broadcasts the information of the CSI-RS configuration to UEs. In the LTE system, when an eNB notifies the contents for the system information to UEs, the corresponding information is transmitted to the Broadcasting Channel (BCH), normally. However, in the case that there are too much contents and it is unable to transmit all of the contents to the BCH, the contents are transmitted in the same way of transmitting normal data, but the PDCCH of the corresponding data is transmitted by masking CRC using the System information RNTI (SI-RNTI), not a specific UE ID (e.g., C-RNTI). And, the actual system information is transmitted to the PDSCH region like the normal unicast data. Then, all of the UE in a cell decodes the PDCCH using the SI-RNTI, and acquires the system information by decoding the PDSCH indicated by the PDCCH. Such a broadcast scheme is also called the Dynamic BCH (DBCH), distinguished from the Physical BCH (PBCH) scheme that is normal broadcast scheme.

The system information broadcasted in the LTE system is divided into two types, largely: The Master Information Block (MIB) transmitted to the PBCH and the System Information Block (SIB) transmitted to the PDSCH with being multiplexed with the normal unicast data. In the LTE system, since the information transmitted in SIB type 1 to SIB type 8 (SIB 1~SIB 8) is already defined, the CSI-RS configuration is transmitted in SIB 9, SIB 10, and so on, that are newly introduced in the LTE-A system.

Next, a second scheme using the RRC signaling may be considered.

The second scheme is the scheme that an eNB notifies the CSI-RS configuration to each of UEs using the dedicated RRC signaling. During the process that a UE establishes a connection to the eNB through an initial access or the handover, the eNB notifies the CSI-RS configuration to the corresponding UE through the RRC signaling. Otherwise, the eNB notifies the CSI-RS configuration through an RRC signaling message that requires a channel state feedback based on the CSI-RS measurement to the UE.

The CSI-RS-Config information element (IE) is used for specifying the CSI-RS configuration.

Table 2 exemplifies the CSI-RS-Config IE.

TABLE 2

```
-- ASN1START
CSI-RS-Config-r10 ::=          SEQUENCE {
    csi-RS-r10                 CHOICE {
        release                NULL,
        setup                  SEQUENCE {
            antennaPortsCount-r10      ENUMERATED {an1, an2, an4, an8},
            resourceConfig-r10         INTEGER (0..31),
            subframeConfig-r10         INTEGER (0..154),
            p-C-r10                    INTEGER (-8..15)
        }
    }                                  OPTIONAL, --
Need ON
    zeroTxPowerCSI-RS-r10      CHOICE {
        release                NULL,
        setup                  SEQUENCE {
            zeroTxPowerResourceConfigList-r10  BIT STRING (SIZE (16)),
            zeroTxPowerSubframeConfig-r10      INTEGER (0..154)
        }
    }                                  OPTIONAL --
Need ON
}
-- ASN1STOP
```

Referring to Table 2, the 'antennaPortsCount' field indicates the number of antenna ports used for transmitting the CSI-RS. The 'resourceConfig' field indicates the CSI-RS configuration. The SubframeConfig' field and the 'zeroTxPowerSubframeConfig' field indicate the subframe configuration ($I_{CSI-RS}$) on which the CSI-RS is transmitted.

The 'zeroTxPowerResourceConfigList' field indicates the zero-power (ZP) CSI-RS configuration. In the bitmap of 16 bit that configures the 'zeroTxPowerResourceConfigList' field, the CSI-RS configuration that corresponds to the bit configured as '1' may be configured as the ZP CSI-RS.

The 'p-c' field represents the parameter ($P_c$) assumed by a ratio of the PDSCH Energy Per Resource Element (EPRE) and the CSI-RS EPRE.

The CSI-RS is transmitted through 1, 2, 4 or 8 antenna ports. In this case, the antenna port which is used is p=15, p=15,16, p=15, . . . , 18, or p=15, . . . , 22, The CSI-RS may be defined only for the subcarrier interval Δf=15 kHz The CSI-RS sequence may be generated by Equation 15 below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 15]

$$m = 0, 1, \ldots, N_{RB}^{max,DL} - 1$$

Herein, $r_{l,n_s}(m)$ represents the generated CSI-RS sequence, c(i) represents the pseudo-random, $n_S$ is a slot number in a radio frame, l represents an OFDM symbol number in a slot, and $N_{RB}^{maxDL}$ represents the maximum RB number in a downlink bandwidth.

The pseudo-random sequence generator is initialized in every OFDM start as represented by Equation 16 below.

$$c_{init} = 2^{10} \cdot (7 \cdot (n_s+1)+l+1) \cdot (2 \cdot N_{ID}^{cell}+1) + 2 \cdot N_{ID}^{cell} + N_{CP}$$ [Equation 16]

In Equation 16, $N_{ID}^{cell}$ represents the cell ID, NCP=1 in the case of the normal CP and NCP=0 in the case of the extended CP.

In the subframe configured to transmit the CSI-RS, the CSI-RS sequence $r_{l,n_s}(m)$ generated through Equation 15 is mapped to the complex-valued modulation symbol $a_{k,l}^{(p)}$ that is used as a reference symbol on each antenna port (p) as represented by Equation 17 below.

$$a_{k,l}^{(p)} = w_{l''} \cdot r_{l,n_s}(m')$$ [Equation 17]

$$k = k' + 12m +$$

$$\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' +$$

$$\begin{cases}
l'' & \text{CSI reference signal configurations 0-19,} \\
& \text{normal cyclic prefix} \\
2l'' & \text{CSI reference signal configurations 20-31,} \\
& \text{normal cyclic prefix} \\
l'' & \text{CSI reference signal configurations 0-27,} \\
& \text{extended cyclic prefix}
\end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 17 above, (k',l') (herein, k' is a subcarrier index in a resource block, and l' represents an OFDM symbol index in a slot) and the condition of $n_s$ is determined according to the CSI-RS configuration shown in Table 3 or Table 4 below.

Table 3 exemplifies the mapping of (k',l') according to the CSI-RS configuration for the normal CP.

TABLE 3

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| . . . | | | | | | |
| 18 | (3, 5) | 1 | | | | |
| 19 | (2, 5) | 1 | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| . . . | | | | | | |
| 29 | (2, 1) | 1 | | | | |
| 30 | (1, 1) | 1 | | | | |
| 31 | (0, 1) | 1 | | | | |

Table 4 exemplifies the mapping of according to the CSI-RS configuration for the extended CP.

TABLE 4

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| ... | | | | | | |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| ... | | | | | | |
| 25 | (2, 1) | 1 | | | | |
| 26 | (1, 1) | 1 | | | | |
| 27 | (0, 1) | 1 | | | | |

Referring to Table 3 and Table 4, for the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

The CSI-RS configuration is different depending on the number of antenna ports in a cell and the CP, neighbor cells may have different configurations to the maximum. In addition, the CSI-RS configuration may be divided into the case of being applied to both the FDD frame and the TDD frame and the case of being applied to only the TDD frame.

Based on Table 3 and Table 4, (k',l') and $n_s$ are determined according to the CSI-RS configuration. By applying these values to Equation 19, the time-frequency resource that each CSI-RS antenna port uses for transmitting the CSI-RS is determined.

FIG. 15 is a diagram illustrating the CSI-RS configuration in a wireless communication system to which the present invention may be applied.

Particularly, FIG. 15 exemplifies the CSI-RS configuration (i.e., the case of normal CP) according to Equation 19 and Table 3.

FIG. 15(a) shows twenty CSI-RS configurations that are usable in the CSI-RS transmission through one or two CSI-RS antenna ports, and FIG. 15(b) shows ten CSI-RS configurations that are usable by four CSI-RS antenna ports. FIG. 15(c) shows five CSI-RS configurations that are usable in the CSI-RS transmission through eight CSI-RS antenna ports.

As such, according to each CSI-RS configuration, the radio resource (i.e., RE pair) in which the CSI-RS is transmitted is determined.

When one or two CSI-RS antenna ports are configured for transmitting the CSI-RS for a specific cell, the CSI-RS is transmitted on the radio resource according to the configured CSI-RS configuration among twenty CSI-RS configurations shown in FIG. 15(a).

Similarly, when four CSI-RS antenna ports are configured for transmitting the CSI-RS for a specific cell, the CSI-RS is transmitted on the radio resource according to the configured CSI-RS configuration among ten CSI-RS configurations shown in FIG. 15(b). In addition, when eight CSI-RS antenna ports are configured for transmitting the CSI-RS for a specific cell, the CSI-RS is transmitted on the radio resource according to the configured CSI-RS configuration among five CSI-RS configurations shown in FIG. 15(c).

The CSI-RS for each of the antenna ports is transmitted with being CDM to the same radio resource for each of two antenna ports (i.e., {15,16}, {17,18}, {19,20}, {21,22}). As an example of antenna ports 15 and 16, although the respective CSI-RS complex symbols are the same for antenna ports 15 and 16, the CSI-RS complex symbols are mapped to the same radio resource with being multiplied by different orthogonal codes (e.g., Walsh code). To the complex symbol of the CSI-RS for antenna port 15, [1, 1] is multiplied, and [1, −1] is multiplied to the complex symbol of the CSI-RS for antenna port 16, and the complex symbols are mapped to the same radio resource. This procedure is the same for antenna ports {17,18}, {19,20} and {21,22}.

A UE may detect the CSI-RS for a specific antenna port by multiplying a code multiplied by the transmitted code. That is, in order to detect the CSI-RS for antenna port 15, the multiplied code [1 1] is multiplied, and in order to detect the CSI-RS for antenna port 16, the multiplied code [1−1] is multiplied.

Referring to FIGS. 15(a) to (c), when a radio resource is corresponding to the same CSI-RS configuration index, the radio resource according to the CSI-RS configuration including a large number of antenna ports includes the radio resource according to the CSI-RS configuration including a small number of antenna ports. For example, in the case of CSI-RS configuration 0, the radio resource for eight antenna ports includes all of the radio resource for four antenna ports and one or two antenna ports.

A plurality of CSI-RS configurations may be used in a cell. Zero or one CSI-RS configuration may be used for the non-zero power (NZP) CSI-RS, and zero or several CSI-RS configurations may be used for the zero power CSI-RS.

A UE presumes the zero power transmission for the REs (except the case of being overlapped with the RE that presumes the NZP CSI-RS that is configured by a high layer) that corresponds to four CSI-RS column in Table 3 and Table 4 above, for every bit that is configured as '1' in the Zero Power CSI-RS (ZP-which is the bitmap of 16 bits configured by a high layer. The Most Significant Bit (MSB) corresponds to the lowest CSI-RS configuration index, and the next bit in the bitmap corresponds to the next CSI-RS configuration index in order.

The CSI-RS is transmitted in the downlink slot only that satisfies the condition of $n_s$ mod 2 in Table 3 and Table 4 above and the CSI-RS subframe configuration.

In the case of frame structure type 2 (TDD), in the subframe that collides with a special subframe, SS, PBCH or SIB 1 (SystemInformationBlockType1) message transmission or the subframe that is configured to transmit a paging message, the CSI-RS is not transmitted.

In addition, the RE in which the CSI-RS for a certain antenna port that is belonged to an antenna port set S (S={15}, S={15,16}, S={17,18}, S={19,20} or S={21,22}) is transmitted is not used for transmitting the PDSCH or the CSI-RS of another antenna port.

Since the time-frequency resources used for transmitting the CSI-RS is unable to be used for transmitting data, the data throughput decreases as the CSI-RS overhead increases. Considering this, the CSI-RS is not configured to be transmitted in every subframe, but configured to be transmitted in a certain transmission period that corresponds to a plurality of subframes. In this case, the CSI-RS transmission overhead may be significantly decreased in comparison with the case that the CSI-RS is transmitted in every subframe.

The subframe period (hereinafter, referred to as 'CSI-RS transmission period'; $T_{CSI-RS}$) for transmitting the CSI-RS and the subframe offset ($\Delta_{CSI-RS}$) are represented in Table 5 below.

Table 5 exemplifies the configuration of CSI-RS subframe.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, according to the CSI-RS subframe configuration ($I_{CSI-RS}$) the CSI-RS transmission period ($T_{CSI-RS}$) and the subframe offset ($\Delta_{CSI-RS}$) are determined.

The CSI-RS subframe configuration in Table 5 is configured as one of the SubframeConfig' field and the 'zeroTxPowerSubframeConfig' field in Table 2 above. The CSI-RS subframe configuration may be separately configured for the NZP CSI-RS and the ZP CSI-RS.

The subframe including the CSI-RS satisfies Equation 18 below.

$$(10n_f + \lfloor n_s/2 \rfloor - \Delta_{CSI-RS}) \bmod T_{CSI-RS} = 0 \quad \text{[Equation 18]}$$

In Equation 18, $T_{CSI-RS}$ represents the CSI-RS transmission period, $\Delta_{CSI-RS}$ represents the subframe offset value, $n_f$ represents the system frame number, and $n_s$ represents the slot number.

In the case of a UE to which transmission mode 9 is set for a serving cell, a single CSI-RS resource may be set to the UE. In the case of a UE to which transmission mode 10 is set for a serving cell, one or more CSI-RS resources may be set to the UE.

For each CSI-RS resource configuration, the following parameters may be set through high layer signaling.

In the case that transmission mode 10 is set, the CSI-RS resource configuration identifier The number of CSI-RS ports The CSI-RS configuration (refer to Table 3 and Table 4)

The CSI-RS subframe configuration ($I_{CSI-RS}$ refer to Table 5)

In the case that transmission mode 9 is set, the transmission power ($P_c$) for the CSI feedback In the case that transmission mode 10 is set, the transmission power ($P_c$) for the CSI feedback with respect to each CSI process. When the CSI subframe sets $C_{CSI,0}$ and $c_{CSI,1}$ are set by a high layer for the CSI process, $P_c$ is set for each CSI subframe set of the CSI process.

The pseudo-random sequence generator parameter ($n_{ID}$)

In the case that transmission mode 10 is set, the QCL scrambling identifier (qcl-ScramblingIdentity-r11) for assuming the Quasi Co-Located (QCL) type B UE, the CRS port count (crs-PortsCount-r11), and the high layer parameter ('qcl-CRS-Info-r11') that includes the MBSFN subframe configuration list (mbsfn-SubframeConfigList-r11) parameter When the CSI feedback value obtained by a UE has the value in the range of [−8, 15] dB, $P_c$ is presumed by the ratio of the PDSCH EPRE for the CSI-RS EPRE. Herein, the PDSCH EPRE corresponds to the symbol in which the ratio of PDSCH EPRE for the CRS EPRE is $\rho_A$.

In the same subframe of a serving cell, the CSI-RS and the PMCH are not configured together.

When four CRS antenna ports are configured in frame structure type 2, the CSI-RS configuration index belonged to [20-31] set in the case of the normal CP (refer to Table 3) or [16-27] set in the case of the extended CP (refer to Table 4) is not configured to a UE.

A UE may assume that the CSI-RS antenna port of the CSI-RS resource configuration has the QCL relation with the delay spread, the Doppler spread, the Doppler shift, the average gain and the average delay.

The UE to which transmission mode 10 and QCL type B are configured may assume that the antenna ports 0 to 3 corresponding to the CSI-RS resource configuration and the antenna ports 15 to 22 corresponding to the CSI-RS resource configuration have the QCL relation with the Doppler spread and the Doppler shift.

For the UE to which transmission mode 10 is configured, one or more Channel-State Information—Interference Measurement (CSI-IM) resource configuration may be set.

The following parameters may be configured for each CSI-IM resource configuration through high layer signaling.

The ZP CSI-RS configuration (refer to Table 3 and Table 4)

The ZP CSI-RS subframe configuration ($I_{CSI-RS}$ refer to Table 5)

The CSI-IM resource configuration is the same as one of the configured ZP CSI-RS resource configuration.

In the same subframe in a serving cell, the CSI-IM resource and the PMCH are not configured simultaneously.

For the UE to which transmission modes 1 to 9 are set, a ZP CSI-RS resource configuration may be set to the UE for the serving cell. For the UE to which transmission mode 10 is set, one or more ZP CSI-RS resource configurations may be set to the UE for the serving cell.

The following parameters may be configured for the ZP CSI-RS resource configuration through high layer signaling.

The ZP CSI-RS configuration list (refer to Table 3 and Table 4)

The ZP CSI-RS subframe configuration ($I_{CSI-RS}$; refer to Table 5)

In the same subframe in a serving cell, the ZP CSI-RS resource and the PMCH are not configured simultaneously.

Cell Measurement/Measurement Report

For one or several methods among the several methods (handover, random access, cell search, etc.) for guaranteeing the mobility of UE, the UE reports the result of a cell measurement to an eNB (or network).

In the 3GPP LTE/LTE-A system, the cell-specific reference signal (CRS) is transmitted through 0, 4, 7 and $11^{th}$ OFDM symbols in each subframe on the time axis, and used for the cell measurement basically. That is, a UE performs the cell measurement using the CRS that is received from a serving cell and a neighbor cell, respectively.

The cell measurement is the concept that includes the Radio resource management (RRM) measurement such as the Reference signal receive power (RSRP) that measures the signal strength of the serving cell and the neighbor cell or the signal strength in comparison with total reception power, and so on, the Received signal strength indicator (RSSI), the Reference signal received quality (RSRQ), and the like and the Radio Link Monitoring (RLM) measurement that may evaluate the radio link failure by measuring the link quality from the serving cell.

The RSRP is a linear average of the power distribution of the RE in which the CRS is transmitted in a measurement frequency band. In order to determine the RSRP, CRS (R0) that corresponds to antenna port '0' may be used. In addition, in order to determine the RSRP, CRS (R1) that corresponds to antenna port '1' may be additionally used. The number of REs used in the measurement frequency band and the measurement duration by a UE in order to determine the RSRP may be determined by the UE within the limit that satisfies the corresponding measurement accuracy requirements. In addition, the power per RE may be determined by the energy received in the remaining part of the symbol except the CP.

The RSSI is obtained as the linear average of the total reception power that is detected from all sources including the serving cell and the non-serving cell of the co-channel, the interference from an adjacent channel, the thermal noise, and so on by the corresponding UE in the OFDM symbols including the RS that corresponds to antenna port '0'. When a specific subframe is indicated by high layer signaling for performing the RSRQ measurement, the RSSI is measured through all OFDM symbols in the indicated subframes.

The RSRQ is obtained by N×RSRP/RSSI. Herein, N means the number of RBs of the RSSI measurement bandwidth. In addition, the measurement of the numerator and the denominator in the above numerical expression may be obtained by the same RB set.

A BS may forward the configuration information for the measurement to a UE through high layer signaling (e.g., RRC Connection Reconfiguration message).

The RRC Connection Reconfiguration message includes a radio resource configuration dedicated ('radioResourceConfigDedicated') Information Element (IE) and the measurement configuration ('measConfig') IE.

The 'measConfig' IE specifies the measurement that should be performed by the UE, and includes the configuration information for the intra-frequency mobility, the inter-frequency mobility, the inter-RAT mobility as well as the configuration of the measurement gap.

Particularly, the 'measConfig' IE includes 'measObjectToRemoveList' that represents the list of the measurement object ('measObject') that is to be removed from the measurement and 'measObjectToAddModList' that represents the list that is going to be newly added or amended. In addition, 'MeasObjectCDMA2000', 'MeasObjctEUTRA', 'MeasObjectGERAN' and so on are included in the 'measObject' according to the communication technique.

The 'RadioResourceConfigDedicated' IE is used to setup/modify/release the Radio Bearer, to change the MAC main configuration, to change the Semi-Persistent Scheduling (SPS) configuration and to change the dedicated physical configuration.

The 'RadioResourceConfigDedicated' IE includes the 'measSubframePattern-Serv' field that indicates the time domain measurement resource restriction pattern for serving cell measurement. In addition, the 'RadioResourceConfigDedicated' IE includes 'measSubframeCellList' indicating the neighbor cell that is going to be measured by the UE and 'measSubframePattern-Neigh' indicating the time domain measurement resource restriction pattern for neighbor cell measurement.

The time domain measurement resource restriction pattern that is configured for the measuring cell (including the serving cell and the neighbor cell) may indicate at least one subframe per radio frame for performing the RSRQ measurement. The RSRQ measurement is performed only for the subframe indicated by the time domain measurement resource restriction pattern that is configured for the measuring cell.

As such, a UE (e.g., 3GPP Rel-10) should measure the RSRQ only in the duration configured by the subframe pattern ('measSubframePattern-Serv') for the serving cell measurement and the subframe pattern ('measSubframePattern-Neigh') for the neighbor cell measurement.

Although the measurement in the pattern for the RSRQ is not limited, but it is preferable to be measured only in the pattern for the accuracy requirement.

In wireless communication systems, MIMO (Multiple-Input Multiple-Output) technology using multiple transmitting and receiving antennas is introduced for transmission performance enhancement.

When the MIMO technology is used, the number of data streams that can be simultaneously transmitted increases in proportion to the number of transmitting/receiving antennas, resulting in remarkable throughput enhancement.

However, it is necessary to correctly estimate channel information and to perform transmission and reception beamforming on the basis of the estimated channel information in order to make the best use of potential performance of MIMO channels.

To solve a problem that it is difficult to estimate a channel as the number of antennas increases, a method of using multiple codebooks, a method of using channel reciprocity in a TDD based wireless communication environment, and the like have been proposed in legacy systems.

However, the codebook based channel estimation method remarkably increases the amount of feedback information as the number of antennas increases in a widely used FDD system, deteriorating system efficiency.

Further, to estimate a channel formed between a transmitting antenna and a receiving antenna, a reference signal (RS) is disposed at specific intervals in the time domain and the frequency domain.

Here, the number of disposed RSs increases in proportion to the number of antenna elements (or ports), and thus a problem that time and frequency resources, which should be used for data transmission, are not efficiently used may be generated.

Accordingly, the present description provides an efficient channel information feedback and channel estimation method in a wireless communication system using the MIMO technology.

More specifically, the present description provides (1) a method of feeding back part of a channel estimation result and (2) a three-dimensional channel estimation method for mitigating channel information distortion due to time delay in a situation in which the method proposed in the present description is applied, as a method of efficiently acquiring channel information using MIMO channels.

To solve the aforementioned problems, the present invention provides a method of reducing overhead of a reference signal in a process in which an eNB and a UE exchange channel state information and describes a channel estimation method using temporal and spatial autocorrelation in a system to which the reference signal overhead reduction method is applied. In addition, the present invention describes a method of feeding back an RI (rank indicator), a PMI (precoding matrix indicator) and CQI (channel quality indicator) corresponding to channel state information through an estimated channel, and eNB operation conditions for supporting such UE operation.

That is, methods proposed in the present description can be directly applied to massive MIMO using large-scale array antennas including normal MIMO to achieve fast data transmission through multiple antennas with low feedback resource consumption.

First of all, a wireless communication system and an environment thereof to which the methods proposed in the present description are applicable will be described.

FIG. 16 is a schematic diagram of a wireless communication system to which the methods proposed in the present description are applicable.

The methods proposed in the present description are based on currently used wireless communication systems.

The present description proposes a method of estimating a channel between a UE and an eNB and a method of feeding back channel state information in a wireless channel environment.

A description will be given of a wireless communication system and an environment thereof for supporting the methods or operations proposed in the present description.

To define a radio channel in a mobile communication system, a 3D spatial channel model (SCM) defined in 3GPP is used as a channel model.

The 3D SCM is a channel model that reflects actual spatial properties such as an obstacle element.

As shown in FIG. 16, a MIMO system model and an environment thereof are considered and symbols in FIG. 16 are defined as shown in Table 6.

TABLE 6

| Notations | definition |
| --- | --- |
| $\phi_{LOS}$ | LOS azimuth angle of departure |
| $\theta_{LOS}$ | LOS zenith angle of departure |
| $\theta_v$ | Travel azimuth angle (Relative to BS broadside direction) |
| $\delta_H$ | Horizontal angular spread |

TABLE 6-continued

| Notations | definition |
| --- | --- |
| $\delta_V$ | Vertical angular spread |
| dH | Horizontal antenna spacing |
| dV | Vertical antenna spacing |

As shown in FIG. 16, a primary property of a radio channel is to consider a multi-path environment.

In a multi-path environment, a channel formed between a UE and an to eNB is the sum of subchannels generated from radio waves emitted from the eNB.

Further, a time varying characteristic of channels according to mobility of a UE is reflected in the multi-path environment and correlation between channels formed between physical antenna ports depending on antenna arrangement of an eNB is also reflected therein.

Next, a method of estimating a MIMO channel and feeding back channel state information by a UE in a mobile communication system proposed in the present description will be described with reference to related drawings.

FIG. 17 illustrates an example of a feedback antenna port configuration proposed in the present description when the number of logical antenna ports is 16.

Referring to FIG. 17, to enable a UE to estimate a radio channel of an eNB having 16 (M=16) logical antenna ports, the UE may be defined to perform channel estimation using only 4 (L=4) RSs at a time (e.g., per subframe).

In this case, the UE estimates a radio channel from different RS ports over 4 (K=4) cycles.

Here, the number of physical antenna elements may be greater than the number of logical antenna elements and each logical antenna port may be mapped to physical antenna elements with weights through various methods.

It is assumed that each logical antenna port is mapped to one physical antenna element in the methods proposed in the present description for convenience of description.

That is, the UE uses only several RSs at a time and can be previously signaled, by a network (e.g., an eNB), pattern information representing how many cycles are used to measure a radio channel.

That is, the UE estimates only a partial radio channel from L RS ports at a time but can estimate all radio channels from a total of M antennas over the K cycles (e.g., M>L).

Accordingly, to enable such UE operation, the network can previously provide, to the UE, RS resource information, such as cycle and offset information about a transmission time of the L RS ports, sequence scrambling information of the corresponding RS (e.g., which may be scrambling initialization parameter information represented in the form of "virtual cell-id") and information on resource elements (REs) in the time/frequency of the corresponding RS, including the pattern information.

Three-dimensional Time-varying Radio Channel Estimation Method

A description will be given of a three-dimensional channel estimation method for minimizing time-varying radio channel estimation error using Wiener filtering through autocorrelation.

When an eNB and a UE perform channel estimation per subframe through L feedback ports, the UE (or receiving end) can accumulate measured channel information.

The UE collects temporal autocorrelation and spatial autocorrelation information using channel information received through RSs in a corresponding subframe.

The UE measures each RS port and accumulates channel information of the measurement result, as shown in FIG. 17.

The UE may extract autocorrelation through channel information accumulated per antenna port and acquire physical characteristics of a channel formed between the UE and the eNB through the extracted autocorrelation.

A method of acquiring physical characteristics of a radio channel through autocorrelation in (1) time domain and (2) spatial domain will be described in more detail.

Autocorrelation in Time Domain

First of all, a method of acquiring physical characteristics of a radio channel through autocorrelation in the time domain will be described.

Referring to FIG. 17, the UE repeatedly acquires radio channel information from the eNB on a specific cycle through RSs transmitted through antenna ports of the eNB.

That is, the UE can extract autocorrelation of a time-varying channel using channel information repeatedly received on a specific cycle.

Specifically, the UE can acquire a Doppler frequency generated due to mobility thereof through an autocorrelation function (e.g., Ac_t in the present description) extracted from an actual channel vector (or matrix) received through the RS.

Here, the UE uses a theoretical zero-th order Bessel function of the autocorrelation function in a radio channel in order to acquire the Doppler frequency.

A theoretical autocorrelation function with respect to channel time-varying characteristics in a radio channel can be represented by the aforementioned Bessel function $J_0()$ as expressed by Mathematical formula 19.

$$r[n-m] = J_0(2\pi f_d |n-m|T) \qquad \text{[Mathematical formula 19]}$$

Then, the UE performs curve fitting of the autocorrelation of accumulated actual channel information and the theoretical autocorrelation function in order to acquire a Doppler frequency $f_d$ according to mobility of the UE.

Here, curve fitting is performed in such a manner that minimum mean square error (MMSE) is estimated for the autocorrelation function Ac_t of actual channel information according to variation in $f_d$ (e.g., which may be variable in the range of $f_d$=0, 10, . . . , 20) using the theoretical autocorrelation function r[n−m].

Through this process, the UE acquires the Doppler frequency $f_d^{eff}$ thereof.

Autocorrelation in Spatial Domain

Next, a method of acquiring physical characteristics of a radio channel through autocorrelation in the spatial domain will be described.

According to this method, the UE accumulates channel information of vertical and horizontal logical (and physical) antenna ports according to a pattern of antenna ports grouped per subframe upon acquisition of channel information measured for RS transmission from the eNB.

FIG. 18 illustrates examples of vertical and horizontal antenna port groups to which methods proposed in the present description are applicable.

Particularly, FIG. 18a illustrates an example of a vertical antenna port group and FIG. 18b illustrates an example of a horizontal antenna port group.

As shown in FIG. 18, the UE can extract spatial autocorrelation of channel information of the vertical antenna port group and autocorrelation of the horizontal antenna port group through channel information accumulated separately for vertical and horizontal antenna port groups).

The UE acquires angular spreads $\delta_V$ and $\delta_H$ for spatial characteristics through the extracted autocorrelation functions (e.g., defined as Ac_v and Ac_h for the vertical and horizontal antenna port groups in the present description) in the actual channel received through the RS from the eNB in a manner identical or similar to the autocorrelation method in the time domain.

To acquire the angular spreads $\delta_V$ and $\delta_H$, the zero-th Bessel function is used as an autocorrelation function in the spatial domain.

When the vertical axis is defined as $r_V$ and the horizontal axis is defined as $r_H$, a defined theoretical autocorrelation function is represented by mathematical formula 20.

$$r_V[k-l] = J_0\left(2\pi\delta_V |k-l|\frac{d_V}{\lambda}\right), \qquad \text{[Mathematical formula 20]}$$

$$r_H[i-j] = J_0\left(2\pi\delta_H |i-j|\frac{d_H}{\lambda}\right)$$

Further, the UE can acquire angular spreads $\delta_V$ and $\delta_H$ according to obstacle effect depending on the location of the UE user for the vertical axis and the horizontal axis through curve fitting.

Here, curve fitting is performed in such a manner that MMSE is estimated for the autocorrelation functions Ac_v and Ac_h of actual channel information according to variations in $\delta_V$ and $\delta_H$ (e.g., which may be variables in the range of $\delta_V$, $\delta_H$=0, 0.01, . . . 3) using the theoretical autocorrelation functions $r_V[k-1]$ and $r_H[i-j]$.

That is, each UE acquires angular spreads $\delta_V^{eff}$ and $\delta_H^{eff}$ thereof through the aforementioned process.

Upon acquisition of channel characteristic elements of the time and spatial domains through the above-described methods, the UE additionally reports the acquired information to the eNB.

In the legacy mobile communication standard, a UE transmits channel state information (CSI) to an eNB over an uplink channel.

For improvement of channel estimation accuracy, the UE may additionally allocate the acquired information to an RS to transmit the acquire information as in the method proposed in the present description.

FIG. 19 illustrates the concept of a three-dimensional channel estimation method proposed in the present description.

As illustrated in FIG. 19, an eNB performs channel estimation through a Doppler frequency and vertical and horizontal angular spreads received from each UE.

Here, the eNB performs channel estimation by performing channel vector (or matrix) prediction and interpolation through Wiener filtering using channel information about L logical antenna ports, which is intermittently fed back from each UE, and information $f_d^{eff}$, $\delta_V^{eff}$ and $\delta_H^{eff}$, which are additionally received from each UE.

That is, Wiener filtering that estimates omitted channel information $\hat{h}$ using autocorrelation for known channel information $h_i$ is performed through a method represented by Mathematical formulas 21 and 22.

$$w[n] = R^{-1}\sigma[n] \qquad \text{[Mathematical formula 21]}$$

$$\hat{h}[n] = \Sigma_{i \in \tilde{n}} w_i[n] h_i \qquad \text{[Mathematical formula 22]}$$

In Mathematical formula 21, w represents a Wiener coefficient vector, R represents an autocorrelation matrix and σ represents a cross correlation vector.

A correlation function of an estimation method for constituting elements of the autocorrelation matrix and the cross correlation vector is represented by Mathematical formula 23.

$$r_{BS}^{(i,j)(k,l)(n,m)} = J_0\left(2\pi\delta_H^{eff}|i-j|\frac{d_H}{\lambda}\right)$$
$$J_0\left(2\pi\delta_H^{eff}|k-l|\frac{d_V}{\lambda}\right)J_0(2\pi f_d^{eff}|n-m|T)$$

[Mathematical formula 23]

An example of a detailed procedure performed by an eNB and a UE to perform the aforementioned three-dimensional channel estimation method proposed in the present description will be described with reference to FIG. 20.

FIG. 20 is a flowchart illustrating an example of operations of an eNB and a UE to perform the three-dimensional channel estimation method proposed in the present description.

While FIG. 20 illustrates an example in which an eNB performs MU-MIMO transmission using an interpolated channel estimation result acquired through 3D prediction (Wiener filtering), it is apparent that the present description is not limited thereto and can be used for SU-MIMO transmission.

Referring to FIG. 20, the method for estimating a three-dimensional channel may be divided into (1) reference signal transmission operation S2010 of an eNB, (2) operation S2020 of a UE to calculate parameters related to three-dimensional channel estimation in time/spatial domains and to feed back the parameters to the eNB and (3) three-dimensional channel estimation operation S2030 of the eNB.

Operations (1) to (2) will be described in more detail.

First, operation S2010 will be described.

An eNB of an M×M MIMO system provides a service using a three-dimensional special channel model (3D-SCM) (S2011).

Then, the eNB repeatedly transmits a reference signal to a UE per antenna port by codebook extension (S2012).

The antenna port refers to an antenna port related to feedback of channel state information.

Next, operation (2) S2020 will be described. Operation (2) can be divided into operations of time domain 2-1 and spatial domain 2-2.

First, UE operation in the time domain will be described. Each UE accumulates channel information accumulated on the basis of reference signals received through antenna ports of the eNB to calculate actual autocorrelation (S2021).

Then, the UE performs curve fitting using the MMSE method for the autocorrelation acquired in step S2021 and an autocorrelation function (Bessel function) J0( ) (S2022).

Subsequently, the UE acquires a Doppler frequency $f_d^{eff}$ through curve fitting performed in step S2022 (S2023).

Thereafter, the UE reports the Doppler frequency $f_d^{eff}$ to the eNB on a specific cycle (S2024).

UE operation 2-2 in the spatial domain will be described. The UE accumulates channel information of a vertical antenna port group and a horizontal antenna port group (S2025).

Then, the UE acquires autocorrelation for the respective groups (the vertical antenna port group and the horizontal antenna port group) (S2026).

Subsequently, the UE performs curve fitting using the MMSE method for the autocorrelation acquired in step S2026 and an autocorrelation function (Bessel function) J0( ) (S2027).

Thereafter, the UE acquires effective angular spreads $\delta_V$ and $\delta_H$ for the vertical antenna port group and the horizontal antenna port group (S2028).

The UE reports angular spreads $\delta_V^{eff}$ and $\delta_H^{eff}$ thereof to the eNB on a specific cycle (S2029).

Next, operation (3) S2030 will be described.

The eNB performs three-dimensional channel estimation of the UE using Wiener filtering on the basis of $f_d^{eff}$, $\delta_V^{eff}$ and $\delta_H^{eff}$ reported from the UE through steps S2024 and S2029 (S2031).

Then, the eNB performs ZF (Zero Force) beamforming through an estimated three-dimensional channel (S2032).

Performance Evaluation of Three-dimensional Channel Estimation Method

Next, system level performance evaluation with respect to the three-dimensional channel estimation method proposed in the present description will be described.

System level performance evaluation limits a situation in which an eNB knows perfect channel information and thus channel information estimation is not required (perfect CSIT) to reach an ideal upper limit of performance.

Further, a situation in which the eNB uses 16 (M=16) physical antennas and sequentially transmits channel information to UEs using RSs through antenna ports divided into four (L=4) is considered.

Table 7 shows an example of a specific system environment and specific parameters for comparison of a method of performing 3D channel estimation (prediction) with a method of performing no channel estimation (extension).

TABLE 7

| Parameters | Values |
|---|---|
| Cells | 19-cell, 57-sector (3 sector/cell) |
| UEs | U = 30 UEs per sector |
| Tx antenna | M = 16 (4 × 4) |
|  | with 0.5 λ, 2λ antenna spacing |
| Rx antenna | N = 1 |
| Tx power | 40 W (46 dBm) |
| Noise | −104 dBm/10 MHz |
| Channel model | 3D SCM channel |
| Scheduling | PF (for 30 UEs) |
| Pathloss model | 3D SCM UMa model |
| Antenna pattern | 3D SCM UMa model |
| Antenna height | BS: 25 m, UE: 1.5 m~22.5 m |
| Inter-eNB distance | 500 m |
| Carrier frequency | 2 GHz |
| Cells | 100 frames |
| UEs | 27 km/h |
| Tx antenna | 1 ms |

Here, UE throughput is evaluated as an index for performance evaluation using a cumulative distribution function (CDF).

Throughput defined as "UE throughput [bps/Hz/UE]" is a cumulative weighted sum of each UE and refers to cumulative throughput provided to each UE for a frame period corresponding to "UE lift" of Table 6.

FIG. 21 shows throughput when an antenna spacing is 0.5λ and FIG. 22 shows throughput when the antenna spacing is 2λ.

As shown in FIGS. 21 and 22, the performance of "Prediction" corresponding to a case in which the 3D channel estimation proposed in the present description is used is higher than the performance of "Extension" corresponding to a case in which the method proposed in the present description is not used and approximates "Perfect CSIT" corresponding to the upper limit of performance.

The method of performing 3D channel estimation/prediction operation by an eNB has been described.

That is, the method by which a UE reports, to an eNB, parameters necessary for 3D channel estimation/prediction, such as the aforementioned parameters $f_d^{eff}$, $\delta_V^{eff}$ and $\delta_H^{eff}$ has been described.

Next, a method by which a UE directly performs 3D channel estimation/prediction and reports the result to an eNB will be described.

3D Channel Estimation Method of UE with Respect to Time in the Future

A description will be given of a method through which a UE directly performs 3D channel estimation by applying the aforementioned 3D channel estimation method proposed in the present description to a time in the future and feeds back the result.

This method allows an eNB to know substantial channel state information when transmitting data to UEs.

"Time" defined in the present description may refer to a time unit of a subframe in which an eNB and a UE perform transmission. However, this is not limited thereto and may refer to other time units such as a symbol and a radio frame.

Here, the 3D channel estimation method of a UE with respect to a time in the future is based on the aforementioned 3D channel estimation method.

That is, the 3D channel estimation method of a UE with respect to a time in the future refers to a method through which an eNB indicates a time (in the future) predicted as a time when data will be transmitted to users (or UEs) such that each UE can estimate channel information with respect to the indicated (specific) time through the 3D channel estimation/prediction method and feed back the channel information to the eNB.

A UE repeatedly measures channel information through RSs of L separated antenna ports transmitted from the eNB in a manner similar to the method proposed in "3D channel estimation on a time-varying radio channel".

Then, the UE acquires an effective Doppler frequency in the partial time domain and vertical and horizontal effective angular spreads in the spatial domain.

The above-described method is a method by which each UE reports acquired information such as $f_d^{eff}$, $\delta_V^{eff}$ and $\delta_H^{eff}$ to the eNB, whereas the method which will be described below is a method by which each UE directly performs 3D channel estimation/prediction using the information through Wiener filtering and the like instead of reporting the information to the eNB.

In addition, in the method proposed in the present description, channel estimation is not performed at the current time and the eNB indicates a time at which transmission will be performed to a UE in advance such that the UE performs channel estimation with respect to the indicated time and repots the channel estimation result to the eNB.

Here, the method by which the eNB previously indicates a time when transmission will be performed to a UE may include a method by which the eNB indicates the time through RRF signaling semi-statically or periodically or a method by which the eNB dynamically indicates the time through a control channel such as DCI as necessary.

Channels for all logical (and/or physical) antenna ports of the eNB can be estimated using information of the L separated antenna ports through Wiener filtering.

Accordingly, the UE can acquire PMIs, CQIs and RIs of channels for all the M antenna ports by performing 3D channel estimation through Wiener filtering and report the same to the eNB in the method proposed in the present description, whereas the UE can acquire only PMIs, CQIs and RIs for L antenna ports in the previous method.

For efficient feedback resource/overhead management of a UE, a PMI, a CQI and an RI may be information about the M antenna ports. Alternatively, a method by which the eNB indicates control information related to the PMI, CQI and RI through semi-static signaling (e.g., by RRC) or dynamic indicator (e.g., by DCI) such that they can be flexibly acquired/reported for a specific number of separated antenna ports, L' (L'≤M), may be applicable.

FIG. 23 illustrates an example of the 3D channel estimation method with respect to a time in the future proposed in the present description.

Effective Feedback of Channel State Information

A description will be given of a method of performing 3D channel estimation for multiple points of time in the future and feeding back channel state information as a method for effectively feeding back a PMI, a CQI and an RI corresponding to channel state information.

As an extension to the 3D channel estimation method for a time in the future, a method by which an eNB requests feedback of channel state information of a UE for multiple points of time as well as a present time or a time in the future can be provided.

To this end, the eNB may indicate multiple points of time to a UE through RRC signaling or DCI.

The UE performs 3D channel estimation for each indicated time and acquires/reports channel state information.

For example, the eNB can indicate multiple points of time tn+Δt1, tn+Δt2 and tn+Δt3 to the UE through signaling at the present time (or a specific reference time (e.g., a reference resource)).

The UE estimates channels for the indicated three points of time, acquires all PMIs, CQIs and RIs corresponding to channel state information regarding the points of time and feeds back the same to the eNB.

More specifically, parameter information indicating multiple points of time (e.g., Δt1, Δt2, Δt3, . . . ) may be set for a UE through a specific field of RRC signaling (e.g., per aperiodic CSI reporting configuration, periodic CSI reporting configuration, CSI process configuration or CSI-RS configuration).

In the case of aperiodic CSI (A-CSI) reporting, a combination of parameters related to the multiple points of time (e.g., Δt1, Δt2, Δt3, . . . ), which is assumed for a CSI report, can be dynamically indicated when A-CSI triggering is transmitted through specific DCI (e.g., UL-related DCI format 0 or 4).

Alternatively, a method for differential feedback depending on importance of channel state information may be used for efficient operation of feedback resources.

For example, the UE can acquire CQIs with respect to the three points of time tn+Δt1, tn+Δt2 and tn+Δt3 indicated by the eNB and feed back the CQIs to the eNB. Regarding RIs and/or PMIs, the UE can feed back only values calculated for a specific (representative) point of time (e.g., tn+Δt1) such that fixed values can be used for the three points of time.

This can mean that "common RI restriction" may be applied to the multiple points of time or "common RI and PMI restriction" may be applied thereto.

The UE may feed back such common values to the eNB only at a specific time (e.g., tn+Δt1) to the eNB or may redundantly feed back the common values at the points of time.

Furthermore, the differential feedback method according to importance of channel state information can flexibly designate importance of channel state information using additional RRC signaling depending on channel states and traffic levels between the eNB and UEs.

In addition, multiple MCS (modulation and coding scheme) tables can be newly defined for improvement of CQIs for multiple points of time, fed back to the eNB.

That is, a CQI is selected from a previous MCS table to preferentially acquire the CQI of tn+Δt1, CQIs of tn+Δt2 and tn+Δt3 are acquired by defining an additional MCS sub-tables, and values ΔCQI corresponding to CQI variations of tn+Δt2 and tn+Δt3 relative to the preferentially acquired CQI of tn+Δt1 are selected and fed back.

The additionally operated MCS sub-table is not defined in the existing standard and can be newly defined for the method proposed in the present description.

Furthermore, for application of the aforementioned method, the eNB may transmit additional RRC signaling to the UE depending on a channel state information element fed back by the UE.

Method for Feedback of Channel State Information for Limited Antenna Ports

Next, a method for acquiring, by a UE, channel state information for limited antenna ports when the UE performs 3D channel estimation will be additionally described.

In the aforementioned 3D channel estimation method for a time in the future, a UE may feed back channel state information for M' limited antenna ports (e.g., M'<M) instead of feeding back CQIs, PMIs and RIs corresponding to channel state information for all physical antenna ports M.

Here, a set of limited antenna ports is configured through two methods.

Specifically, the method of feeding back, by a UE, channel state information for limited antenna ports, proposed in the present description, can be divided into (a) physical antenna port case and (2) virtual antenna port case.

Here, it is assumed that logical antenna ports and physical antenna ports are mapped one-to-one as described above.

Accordingly, an antenna port refers to a "physical antenna port" hereinafter for convenience of description.

However, it may be more desirable to generalize an antenna port as a "logical antenna port" instead of a "physical antenna port".

In this case, a specific logical antenna port can be mapped to multiple physical antenna ports with specific weights in various implementations.

A description will be given of the channel state information feedback method of a UE for limited antenna ports in each case.

FIG. 24 illustrates an example of physical antenna port arrangement of an eNB to which methods proposed in the present description are applicable.

Method of Limiting Channel State Information to the Number of Physical Antenna Ports A limited antenna port set in this method is a subset of physical antenna ports of an eNB.

The eNB can indicate a limited antenna port set to a UE through RRC or DCI signaling.

Further, the eNB can specify information about the limited antenna port set as spatial information instead of sequential information by providing information about physical antenna port arrangement of the eNB to the UE in advance through RRC signaling.

Referring to FIG. 24, when the eNB has antenna ports and antenna arrangement as shown in FIG. 24, the eNB can request channel state information of limited antenna ports #1, #2, #3 and #4 for a UE.

Here, the eNB can provide information indicating that 4-column and 4-row antenna arrangement is spatially configured to a UE which will perform 3D channel estimation through RRC signaling and indicate the limited antenna port set {1, 2, 3, 4} to the UE through DCI at a time tn+Δt (or multiple times tn+Δt1 and tn+Δt2) at which the eNB requests channel state information.

The UE to which information of the limited antenna ports is indicated feeds back only CQIs, PMIs and RIs corresponding to M' to the eNB for 3D channel estimation performed thereby.

That is, the UE calculates CSI corresponding to the four ports and feeds back the calculated CSI to the eNB on the assumption that the eNB restrictively transmits CSI-RSs through the four physical antenna ports #1, #2, #3 and #4 at the corresponding time.

Method of Limiting Channel State Information to the Number of Virtual Antenna Ports Next, a method of feeding back channel state information limited to the number of virtual antenna ports will be described.

That is, a method of transmitting CSI-RSs of antenna ports for which an eNB does not perform beamforming to a UE and transmitting, by the UE, CSI feedback for a channel for which specific beamforming is assumed to the eNB will be described.

In this method, a limited antenna port set may be formed by virtualizing physical antenna ports of the eNB.

Physical antenna port virtualization refers to transmission through specific antenna ports using the same CSI-RS.

Antenna ports transmitting the same CSI-RS become a single antenna port virtually and thus a UE can perform channel estimation for the single antenna port.

Further, antenna ports unified through virtualization can perform beamforming through independent beam coefficients.

That is, a UE receives, from the eNB, specific virtualization matrix related information as well as information about a time at which channel state information is requested through DCI signaling.

The UE limits channels for M antenna ports, estimated through 3D channel estimation, to M' channels.

Then, the UE acquires channel state information about the limited M' channels and feeds back the acquired limited channel state information to the eNB.

Dynamic indication on a subframe-by-subframe basis through DCI signaling in the form of A(Aperiodic)-CSI triggering, for example, is applicable to the aforementioned operation of the UE to feed back M' channels in a state in which a specific beam direction is assumed.

FIG. 25 illustrates an example of virtual antenna port arrangement to which methods proposed in the present description are applicable.

Referring to FIG. 25, the eNB can perform vertical virtualization (#1, #2, #3, #4) as shown in FIG. 25 at a specific time tn+Δt in the figure.

The eNB transmits a virtualization matrix V to the UE. Elements of the virtualization matrix V include individual beam coefficients in consideration of the fact that #1, #2, #3 and #4 form beams, as shown in FIG. 26.

In a beam coefficient $e^{j\Theta_n^m}$ of each element of V for beamforming, n indicates the number of virtualized groups and m indicates an antenna port number in each group.

FIG. 26 illustrates an example of a virtualization matrix to which methods proposed in the present description are applicable.

The UE estimates a channel vector h with M=16 at the time tn+Δt through 3D channel estimation.

In addition, the UE acquires a CQI, a PMI and RI corresponding to channel state information of a virtualized channel h̃=hV and feeds back them to the eNB instead of acquiring channel state information of the estimated channel h and feeding back the same to the eNB.

That is, the UE limits all the 16 physical antenna ports to 4 antenna ports through the virtualization matrix V and feeds back channel state information of the 4 virtualized antenna ports to the eNB.

According to another embodiment proposed in the present description, when the eNB signals specific CSI-RS ports to the UE, the eNB applies the virtualization matrix V to multiple physical antenna elements in advance and signals virtualized CSI-RS ports (or precoded CSI-RS ports) to the UE.

Such specific M' (e.g., M'=4) CSI-RS ports can be grouped and defined as a "CSI-RS configuration 1" and other M' CSI-RS ports on which virtualization has been performed in a different form can be grouped and defined as a "CSI-RS configuration 2".

The eNB transmits the defined "CSI-RS configuration 1" and "CSI-RS configuration 2" to the UE and the UE measures related CSI-RSs on the basis of "CSI-RS configuration 1" and "CSI-RS configuration 2".

The eNB may signal, to the UE, related information for performing additional "weighted averaging" on CSI 1 and CSI 2 (e.g., PMI 1 and PMI 2) measured as described above.

Then, the UE may generate additional CSI content calculated on the basis of the information and report the CSI content to the eNB.

For example, referring to FIG. 25, the eNB sets M'-port CSI-RS configuration 1 and M'-port CSI-RS configuration 2 for the UE and the UE measures them.

If M'=4, a CSI-RS port per CSI-RS configuration corresponds to one of each group, #1, #2, #3 or #4, as shown in FIG. 25.

That is, the first CSI-RS port belonging to CSI-RS configuration 1 can form a precoded CSI-RS port virtualized in such a manner that 4 physical antenna ports vertically arranged in group #1 in FIG. 25 are multiplied by specific vertical beam coefficients, for example.

Here, the multiplied specific vertical beam coefficients is assumed as weights to which vertically 100° tilting has been applied, for example.

In this manner, a vertically precoded CSI-RS port is configured per column and thus a total of 4 horizontally placed CSI-RS ports correspond to CSI-RS configuration 1.

In a similar manner, the eNB can set CSI-RS configuration 2 composed of precoded CSI-RS ports multiplied by "specific weights to which vertically 100° tilting has been applied" and signal the same to the UE.

Then, the UE can calculate CSI content (e.g., RI, PMI and CQI) for CSI-RS configuration 1 and CSI-RS configuration 2.

Here, the UE can calculate CSI content on the assumption that "vertically 100° tilting" corresponding to an intermediate vertical angle between the two configurations is applied according to additional CSI reporting indication (e.g., by RRC signaling or DCI signaling) from the eNB and report the CSI content to the eNB.

When the UE receives the CSI reporting indication from the eNB, the UE may assign a weight of ½ to PMI 1 acquired through CSI-RS configuration 1 and PMI 2 acquired through CSI-RS configuration 2 and apply weighted average thereto to generate PMI 3.

The UE calculates new CQI 3 in this assumption and reports the CQI 3 along with CQI 1 and CQI 2 to the eNB.

Here, RI may be restricted to a common RI.

Additional signaling from the eNB to cause the aforementioned operation to be performed may be designed in such a manner that the eNB signals a weighting parameter "r" through RRC signaling or DCI signaling, for example.

Here, r can be defined as a real number. For example, r is assumed to be one of values in the range of {-0.5, 0, 0.2, 0.4, 0.6, 0.8, 1, 1.5}. In this case, r is 3 bits.

(1) PMI 1 estimated through a CSI-RS configuration index (e.g., which can be the lowest index and corresponds to CSI-RS configuration 1) corresponding to a specific criterion can be assumed to correspond to weighting point=0 all the time.

(2) PMI 2 estimated through the next CSI-RS configuration index (e.g., CSI-RS configuration 2) can be assumed to correspond to weighting point=1 all the time.

(3) If the value "r" is 0.4 provided through signaling, the UE newly calculates PMI 3 when calculating CSI reporting content for r and reports the newly calculated PMI 3.

Here, the UE calculates PMI 3 as a weighted average in the form of {vector for PMI 3}={vector for PMI 1}*r+{vector for PMI 2}*(1−r) to decide PMI 3, calculates CQI 3 based on PMI 3 and report the same to the eNB.

In this case, RI may be given common RI restriction.

For convenience of description, a case in which two configurations of CSI-RS configuration 1 and CSI-RS configuration 2 are set has been described as an example.

However, the method proposed in the present description may further provide additional CSI-RS configurations such as CSI-RS configuration 3.

In this case, the UE may be generalized or extended to perform CSI reporting to which the proposed weighted average is applied.

According to the aforementioned methods, the UE can perform prediction (or interpolation or extrapolation) according to the value "r" in addition to CSI content for CSI-RS ports, which is measured by the UE, even in the spatial domain.

The UE can report CSI content related to a prediction result to the eNB. Consequently, channel estimation of the UE can be flexibly used.

The parameter "r" indicating prediction (or interpolation or extrapolation) in the spatial domain can be indicated jointly with the aforementioned parameters related to multiple times (e.g., Δt1, Δt2, Δt3, . . . ), which indicate prediction points in the time domain.

In this case, CSI reporting which assumes joint prediction (or interpolation or extrapolation) in the time domain and spatial domain can be performed.

Apparatuses to which the Present Invention is Applicable

FIG. 27 is a block diagram of a wireless communication apparatus according to an embodiment of the present invention.

Referring to FIG. 27, a wireless communication system includes an eNB 2710 and multiple UEs 2720 located within the coverage of the eNB 2710.

The eNB 2710 includes a processor 2711, a memory 2712 and a radio frequency (RF) unit 2713. The processor 2711 implements functions, processes and/or methods proposed in FIGS. 1 to 26. Radio interface protocol layers can be implemented by the processor 2711. The memory 2712 is connected to the processor 2711 and stores various types of information for driving the processor 2711. The RF unit 2713 is connected to the processor 2711 and transmits and/or receives radio signals.

The UE 2720 includes a processor 2721, a memory 2722 and an RF unit 2723. The processor 2721 implements functions, processes and/or methods proposed in FIGS. 1 to 26. Radio interface protocol layers can be implemented by the processor 2721. The memory 2722 is connected to the processor 2721 and stores various types of information for driving the processor 2721. The RF unit 2723 is connected to the processor 2721 and transmits and/or receives radio signals.

The memories 2712 and 2722 may be located inside or outside of the processors 2711 and 2721 and connected to the processors 2711 and 2722 through various known means. Furthermore, the eNB 2710 and/or the UE 2720 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While examples in which channel estimation in the wireless communication system according to the present invention are applied to 3GPP LTE/LTE-A have been described, the present invention is applicable to various wireless communication systems in addition to 3GPP LTE/LTE-A.

The invention claimed is:

1. A method for performing, by a UE, channel estimation in a wireless communication system, the method comprising:
receiving, from an eNB, a control message including reference signal transmission pattern information representing a transmission pattern of a channel estimation reference signal (RS) transmitted through antenna ports;
receiving the reference signal from the eNB based on the received reference signal transmission pattern information;
measuring channel information per antenna port of the eNB based on the received reference signal;
accumulating the measured channel information;
acquiring autocorrelation in the time domain and/or the spatial domain based on the accumulated channel information;
calculating parameters related to 3D channel estimation;
receiving, from the eNB, channel estimation time information for a time when the 3D channel estimation will be performed and virtualization matrix information related to virtualization of a corresponding antenna port;
performing the 3D channel estimation based on the received channel estimation time information; and
feeding back channel state information related to the 3D channel estimation to the eNB,
wherein the reference signal transmission pattern is a form that at least one or more reference signals are transmitted through antenna ports over at least one or more cycles and one cycle relates to one sub-frame,
wherein the antenna ports are determined among total antenna ports of the eNB by the pattern and are different from antenna ports determined from a previous cycle,
wherein the 3D channel estimation is performed for some antenna ports of the total antenna ports,
wherein the some antenna ports are virtualized, the virtualization referring to receiving of the same reference signal through the some antenna ports, and
wherein independent beam coefficients for antenna ports are applied to the virtualization matrix information.

2. The method according to claim 1, wherein the reference signal transmission pattern is a faun in which L reference signals are transmitted through different antenna ports over K cycles at a specific time.

3. The method according to claim 2, wherein the control message includes at least one of transmission cycle and offset information related to transmission times of the L reference signals, sequence scrambling information of each reference signal and transmission resource information of each reference signal.

4. The method according to claim 1, wherein the specific time is a time on a subframe-by-subframe basis, a symbol-by-symbol basis or a radio frame-by-radio frame basis.

5. The method according to claim 1, wherein the calculated parameters are transmitted along with the channel state information to the eNB.

6. The method according to claim 1, wherein the 3D channel estimation is performed through Wiener filtering.

7. The method according to claim 1, wherein the acquiring of autocorrelation in the time domain comprises acquiring a Doppler frequency $f_d$ according to mobility of the UE.

8. The method according to claim 7, wherein the acquiring of the Doppler frequency $f_d$ uses the autocorrelation according to the accumulated channel information and autocorrelation acquired by a Bessel function.

9. The method according to claim 1, wherein the acquiring of autocorrelation in the spatial domain comprises:
   measuring channels for a first group of antenna ports and a second group of antenna ports, the first group being a horizontal group of L antenna ports, and the second group being a vertical group of L antenna ports;
   accumulating channel information regarding antenna ports, measured per group;
   acquiring autocorrelation for antenna ports in the first group and autocorrelation for antenna ports in the second group; and
   acquiring an angular spread per group based on the acquired autocorrelation.

10. The method according to claim 1, wherein the channel estimation time information is received from the eNB through RRC signaling or downlink control information (DCI).

11. The method according to claim 1, wherein the 3D channel estimation is performed at multiple specific times, and 3D channel information estimated at the multiple specific times is transmitted to the eNB.

12. The method according to claim 1, wherein the 3D channel estimation is performed only at one of multiple specific times, and 3D channel information estimated at the specific time is transmitted to the eNB at each of the multiple specific times or transmitted to the eNB only at the specific time.

13. The method according to claim 1, further comprising receiving, from the eNB, information related to the some antenna ports for which the 3D channel estimation is performed.

14. The method according to claim 1, wherein the some antenna ports are composed of multiple CSI (Channel Status Information)-RS (Reference Signal) port groups, and further comprising:
   receiving, from the eNB, CSI-RS configuration information related to the CSI-RS port groups;
   performing 3D channel estimation for the CSI-RS port groups based on the received CSI-RS configuration information;
   generating new channel state information by multiplying the estimated CSI-RS port groups by different weight coefficients; and
   transmitting the newly generated channel state information to the eNB.

15. A UE for performing channel estimation in a wireless communication system, the UE comprising:
   an RF (Radio Frequency) unit configured to transmit and receive radio signals; and
   a processor functionally connected to the RF unit and controlling the UE,
   wherein the processor is configured to:
   receive, from an eNB, a control message including reference signal transmission pattern information representing a transmission pattern of a channel estimation reference signal (RS) transmitted through antenna ports;
   receive the reference signal from the eNB based on the received reference signal transmission pattern information;
   measure channel information per antenna port of the eNB based on the received reference signal;
   accumulate the measured channel information;
   acquire autocorrelation in the time domain and/or the spatial domain based on the accumulated channel information;
   calculate parameters related to 3D channel estimation;
   receive, from the eNB, channel estimation time information for a time when the 3D channel estimation will be performed and virtualization matrix information related to virtualization of a corresponding antenna port;
   perform the 3D channel estimation based on the received channel estimation time information; and
   feedback channel state information related to the 3D channel estimation to the eNB,
   wherein the reference signal transmission pattern is a form that at least one or more reference signals are transmitted through antenna ports over at least one or more cycles and one cycle relates to one sub-frame,
   wherein the antenna ports are determined among total antenna ports of the eNB by the pattern and are different from antenna ports determined from a previous cycle,
   wherein the 3D channel estimation is performed for some antenna ports of the total antenna ports,
   wherein the some antenna ports are virtualized, the virtualization referring to receiving of the same reference signal through the some antenna ports, and
   wherein independent beam coefficients for antenna ports are applied to the virtualization matrix information.

* * * * *